US007240067B2

(12) United States Patent
Timmons

(10) Patent No.: US 7,240,067 B2
(45) Date of Patent: Jul. 3, 2007

(54) SYSTEM AND METHODOLOGY FOR EXTRACTION AND AGGREGATION OF DATA FROM DYNAMIC CONTENT

(75) Inventor: Michael Timmons, San Jose, CA (US)

(73) Assignee: Sybase, Inc., Dublin, CA (US)

( * ) Notice: Subject to any disclaimer, the term of this patent is extended or adjusted under 35 U.S.C. 154(b) by 554 days.

(21) Appl. No.: 10/709,475

(22) Filed: May 7, 2004

(65) Prior Publication Data

US 2004/0199497 A1  Oct. 7, 2004

Related U.S. Application Data

(63) Continuation-in-part of application No. 09/780,993, filed on Feb. 8, 2001, now Pat. No. 6,735,586.

(60) Provisional application No. 60/246,674, filed on Nov. 7, 2000, provisional application No. 60/219,156, filed on Jul. 19, 2000, provisional application No. 60/180,994, filed on Feb. 8, 2000.

(51) Int. Cl.
*G06F 17/30* (2006.01)

(52) U.S. Cl. .................. 707/101; 707/104.1; 715/515; 715/503

(58) Field of Classification Search .............. 707/1–10, 707/100–104.1, 200–206; 715/503, 513
See application file for complete search history.

(56) References Cited

U.S. PATENT DOCUMENTS

| | | | |
|---|---|---|---|
| 4,959,769 A | 9/1990 | Cooper et al. ............... 707/200 |
| 4,965,763 A | 10/1990 | Zamora .......................... 704/1 |
| 5,181,162 A | 1/1993 | Smith et al. ................. 715/530 |
| 5,267,155 A | 11/1993 | Buchanan et al. ........... 715/540 |
| 5,327,554 A | 7/1994 | Palazzi, III et al. ......... 725/110 |
| 5,347,632 A | 9/1994 | Filepp et al. ................ 709/202 |
| 5,392,428 A | 2/1995 | Robins ........................... 707/3 |
| 5,408,655 A | 4/1995 | Oren et al. ............... 715/501.1 |
| 5,423,043 A | 6/1995 | Fitzpatrick et al. .......... 719/317 |
| 5,530,852 A | 6/1996 | Meske et al. ................ 709/206 |
| 5,649,186 A | 7/1997 | Ferguson ...................... 707/10 |
| 5,737,560 A | 4/1998 | Yohanan ...................... 715/847 |
| 5,754,939 A | 5/1998 | Herz et al. .................. 455/3.04 |
| 5,758,361 A | 5/1998 | Van Hoff ..................... 715/513 |
| 5,761,662 A | 6/1998 | Dasan .......................... 707/10 |
| 5,764,906 A | 6/1998 | Edelstein et al. ............ 709/219 |
| 5,794,257 A | 8/1998 | Liu et al. .................. 715/501.1 |
| 5,850,352 A | 12/1998 | Moezzi et al. .............. 345/419 |
| 5,867,661 A | 2/1999 | Bittinger et al. ............. 709/227 |
| 5,870,559 A | 2/1999 | Leshem et al. .............. 709/224 |

(Continued)

*Primary Examiner*—Yicun Wu
(74) *Attorney, Agent, or Firm*—G. Mack Riddle; John A. Smart

(57) ABSTRACT

A system and methodology for extraction and aggregation of data from dynamic content is described. In one embodiment, for example, a method is described for extracting and structuring items of data from content available via the Internet, the method comprises steps of: receiving input of a user specifying at least one source of content available via the Internet, types of data to be extracted from the at least one source, and fields for structuring extracted items of data; retrieving content from the at least one source; parsing the retrieved content to extract items of data of the types specified by the user; and mapping the extracted items of data to the fields specified by the user so as to transform the extracted items of data into a structured format.

63 Claims, 22 Drawing Sheets

U.S. PATENT DOCUMENTS

| | | | |
|---|---|---|---|
| 5,877,766 A | 3/1999 | Bates et al. | 715/854 |
| 5,878,218 A | 3/1999 | Maddalozzo et al. | 709/213 |
| 5,886,683 A | 3/1999 | Tognazzini et al. | 715/700 |
| 5,887,139 A | 3/1999 | Madison et al. | 709/223 |
| 5,890,152 A | 3/1999 | Rapaport et al. | 707/6 |
| 5,890,171 A | 3/1999 | Blumer et al. | 715/501.1 |
| 5,894,554 A | 4/1999 | Lowery et al. | 709/203 |
| 5,897,644 A | 4/1999 | Nielsen | 715/513 |
| 5,898,830 A | 4/1999 | Wesinger et al. | 713/201 |
| 5,917,997 A | 6/1999 | Bell et al. | 714/4 |
| 5,923,854 A | 7/1999 | Bell et al. | 709/243 |
| 5,926,179 A | 7/1999 | Matsuda et al. | 715/752 |
| 5,933,596 A | 8/1999 | Mayhew | 709/203 |
| 5,945,993 A | 8/1999 | Fleischmann | 715/771 |
| 5,954,798 A | 9/1999 | Shelton et al. | 709/224 |
| 5,956,038 A | 9/1999 | Rekimoto | 345/419 |
| 5,961,594 A | 10/1999 | Bouvier et al. | 709/223 |
| 5,974,455 A | 10/1999 | Monier | 709/223 |
| 5,983,262 A | 11/1999 | Kukkal | 709/204 |
| 5,991,798 A | 11/1999 | Ozaki et al. | 709/217 |
| 5,999,944 A | 12/1999 | Lipkin | 707/104.1 |
| 6,003,065 A | 12/1999 | Yan et al. | 709/201 |
| 6,006,260 A | 12/1999 | Barrick et al. | 709/224 |
| 6,006,264 A | 12/1999 | Colby et al. | 709/226 |
| 6,009,429 A | 12/1999 | Greer et al. | 707/10 |
| 6,026,433 A | 2/2000 | D'Arlach et al. | 709/217 |
| 6,029,182 A | 2/2000 | Nehab et al. | 715/523 |
| 6,032,162 A | 2/2000 | Burke | 715/501.1 |
| 6,038,598 A | 3/2000 | Danneels | 709/219 |
| 6,052,730 A | 4/2000 | Felciano et al. | 709/225 |
| 6,058,425 A | 5/2000 | White | 709/227 |
| 6,061,695 A | 5/2000 | Slivka et al. | 715/513 |
| 6,067,559 A | 5/2000 | Allard et al. | 709/202 |
| 6,182,116 B1 | 1/2001 | Namma et al. | 709/204 |
| 6,408,360 B1 | 6/2002 | Chamberlain et al. | 711/124 |
| 6,430,624 B1 | 8/2002 | Jamtgaard et al. | 709/246 |
| 6,507,867 B1 | 1/2003 | Holland et al. | 709/219 |
| 6,613,098 B1 * | 9/2003 | Sorge et al. | 715/503 |
| 6,735,586 B2 | 5/2004 | Timmons | 707/3 |
| 6,925,595 B1 * | 8/2005 | Whitledge et al. | 715/513 |

* cited by examiner

| Dictionary | | |
|---|---|---|
| Dictionary Action | Term | Model Tag |
| Replace All Tags When Text Contains | Original Article | **original |
| Replace All Tags When Text Contains | Posted By | **posted |
| No Rule | | |

1131 — Dictionary Action
1132 — Term
1133 — Model Tag
1130 — (table)

Sources | Term Dictionary | Field Names | Model Builder | Preview Model | Preview Pivot Model | Search

FIG. 11B

| Column Name | Content Tag | Content Text |
|---|---|---|
| No Column | CAMMMM | Home Page | Latest Posts | Short Cuts | Archives |
| No Column | CAMMMM | Register | Rules | Search | Post | Contact | FAQ |
| No Column | BAMMMM | Lucianne Live! Every morning Monday thru Friday |
| No Column | BMMGCM | 8:00 A.M. to 9:00 A.M. EST. |
| No Column | EMMGMM | Thursday, February 26, 2004 |
| No Column | CAMKCM | U.S. Lifts 23 Year Old Ban on Travel to Libya |
| No Column | CAMMMM | Latest Howard Stern Show Taken Off Clear Channel Stations |
| No Column | AAMMCM | Boobgate Fall-out? Or simple heads-up for foul mouth jock Rumsfeld in Afghanist… |
| No Column | CAMIEM | A sign it's serious McAuliffe won't return as DNC boss |
| No Column | BAMMMM | Interesting Rebel Fighters Converge on Haiti Capital |
| No Column | CAMIEM | Latest From the region Kerry Donors Include 'Benedict Arnolds' |
| No Column | CAMMMM | The WaPo takes note France Urges Global Police Force For Haiti |
| No Column | CAMHEM | After you, Alphonse Schwarzenegger Widely Popular; Pessimism About State De… |
| No Column | CAMKEM | The secret is out - people like him Official Ldotter 'Passion' Thread 4 |
| No Column | EMMKEM | Commentary thread for those who have seen the film From the Editor's De… |
| No Column | GMMMCM | FAQ's and more. |
| No Column | CMMMMM | Reaction of the Week. "Still, more than once, Mr. Kerry's answers would wander … |
| No Column | CMMMMM | -Adam Nagourney on John Kerry's meeting with New York Times editors |
| No Column | EAMMCM | LComStaff chicken waits for inevitable marriage proposal Short Cuts Quick clicks: |
| No Column | EMMMMM | From the Editor's Desk… |
| No Column | BAMMMM | Post New Article |
| No Column | **origarticle | Baby boomers face retirement squeeze |
| No Column | **origarticle | Christian Science Monitor, by Gail Russe3ll Chaddock Original Article |
| No Column | **postedby | Posted By: Gazoo - 2/26/2004 4:41:47 PM Post Reply |
| No Column | FMMMMM | A number of factors - including a sobered stock market, deficit pressures, and co… |
| No Column | EAMMCM | Dems vs. Foreigners |
| No Column | **origarticle | Opinion Journal/The Wall Street Journal, by James Taranto Original Article |
| No Column | **postedby | Posted By: Dreadnought - 2/26/2004 4:41:05 PM Post Reply |
| No Column | GMMBEM | There's no word other than xenophobic to describe John Kerry's cam… |
| No Column | EAMMMM | Official Ldotter 'Passion' Thread |
| No Column | **origarticle | Lucianne.com News Forum, by LComStaff Original Article |
| No Column | **postedby | Posted By: LComStaff10 - 2/26/2004 4:38:33 PM Post Reply |
| No Column | FMMMCM | If you are among those who have seen Mel Gibson's "The Passion of the Christ" … |

Column Titles

| title | date | text | Field 4 | Field 5 | Field 6 | Field 7 | Field 8 | Field 9 |
|---|---|---|---|---|---|---|---|---|
| author | | | | | | | | |
| Christian Science Monitor, by Gail Russell Chaddock Original Article | | | | | | | | |
| Opinion Journal/The Wall Street Journal, by James Taranto Original Article | | | | | | | | |
| Lucianne.com News Forum, by LComStaff Original Article | | | | | | | | |
| AP, by SHARON THEIMER, Original Article | | | | | | | | |
| Jerusalem Post, by JUDEA PEARL Original Article | | | | | | | | |
| AP, by HERB KEINON Original Article | | | | | | | | |
| Agence France-Presse, by Staff Original Article | | | | | | | | |
| Reuters, by Staff Original Article | | | | | | | | |
| Aviation Week, by Rodney L. Pringle Original Article | | | | | | | | |
| Forbes.com, by Luisa Kroll and Lea Goldman Original Article | | | | | | | | |
| Reuters, by Erik de Castro Original Article | | | | | | | | |
| AP, by Staff Original Article | | | | | | | | |
| BBC News, by Staff Original Article | | | | | | | | |
| Deutsche Welle, By Staff Original Article | | | | | | | | |
| Canadian Press, By Staff Original Article | | | | | | | | |
| BBC News, by Staff Original Article | | | | | | | | |
| BBC News, by Staff Original Article | | | | | | | | |
| CNSNews.com, by Patrick Goodenough Original Article | | | | | | | | |
| Daily Iowan, By Sarah Franklin Original Article | | | | | | | | |
| Jewish World Review, by Larry Eder Original Article | | | | | | | | |
| Swiss Info, by Staff Original Article | | | | | | | | |
| Reuters, by Staff Original Article | | | | | | | | |
| Associated Press, by Robert Weller Original Article | | | | | | | | |
| National Review Online, by Frank J. Gaffney Jr. Original Article | | | | | | | | |
| National Review Online, by Mark R. Levin Original Article | | | | | | | | |

Sources | Term Dictionary | Field Names | Model Builder | Preview Model | Preview Pivot Model | Search

FIG. 11G

SYSTEM AND METHODOLOGY FOR EXTRACTION AND AGGREGATION OF DATA FROM DYNAMIC CONTENT

CROSS REFERENCE TO RELATED APPLICATIONS

The present application is related to and claims the benefit of priority of the following commonly-owned, presently nonprovisional application(s): application Ser. No. 09/780,993, filed Feb. 8, 2001, now U.S. Pat. 6,735,586 entitled "System and Method for Dynamic Content Retrieval", of which the present application is a Continuation-in-part application thereof. The disclosure of the foregoing application is hereby incorporated by reference in its entirety, including any appendices or attachments thereof, for all purposes.

COPYRIGHT STATEMENT

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

APPENDIX DATA

Computer Program Listing Appendix under Sec. 1.52(e): This application includes a transmittal under 37 C.F.R. Sec. 1.52(e) of a Computer Program Listing Appendix. The Appendix, which comprises text file(s) that are IBM-PC machine and Microsoft Windows Operating System compatible, includes the below-listed file(s). All of the material disclosed in the Computer Program Listing Appendix can be found at the U.S. Patent and Trademark Office archives and is hereby incorporated by reference into the present application.

Object Description: SourceCode.txt, size 27.1 KB, created May 7, 2004, 8:29 am; Object ID: File No. 1; Object Contents: Source Code.

BACKGROUND OF INVENTION

1. Field of the Invention

This invention relates to the field of content retrieval. In particular, the invention relates to a computer system and methodology for extracting and aggregating data from dynamic content.

2. Description of the Background Art

Computers are very powerful tools for storing and providing access to vast amounts of information. The first personal computers were largely stand-alone units with no direct connection to other computers or computer networks. Data exchanges between computers were mainly accomplished by exchanging magnetic or optical media such as floppy disks. Over time, more and more computers were connected to each other and exchanged information using Local Area Networks ("LANs") and/or Wide Area Networks ("WANs"). Initially such connections were primarily amongst computers within the same organization via an internal network. More recently, the explosive growth of the Internet has provided access to tremendous quantities of information from a wide variety of sources. The Internet comprises a vast number of computers and computer networks that are interconnected through communication links. The World Wide Web (WWW) portion of the Internet allows a server computer system to send graphical Web pages of information to a remote client computer system. The remote client computer system can then display the Web pages in a Web browser application (e.g., Netscape Navigator or Microsoft Internet Explorer). To view a specific Web page, a client computer system specifies the Uniform Resource Locator ("URL") for that Web page in a request (e.g., a HyperText Transfer Protocol ("HTTP") request). The request is forwarded to the Web server that supports that Web page. When that Web server receives the request, it sends the specified Web page to the client computer system. When the client computer system receives that Web page, it typically displays the Web page using a browser application.

Currently, Web pages are typically defined using HyperText Markup Language ("HTML"). HTML provides a standard set of tags that define how a Web page is to be displayed. When a user indicates to the browser to display a Web page, the browser sends a request to the server computer system to transfer to the client computer system a HTML document that defines the Web page. When the requested HTML document is received by the client computer system, the browser displays the Web page as defined by the HTML document. The HTML document contains various tags that control the displaying of text, graphics, controls and other features. The HTML document may also contain URLs of other Web pages available on that server computer system or other server computer systems. Web pages may also be defined using other markup languages, including cHTML, XML, and XHTML.

Every day, more and more information is made available via the Internet. The challenge posed to users is how to efficiently locate, access, and use information and applications that are relevant to them from amongst the huge quantities of materials that are available in a variety of different formats. The WWW is made up of millions of "Web sites" with each site having a number of HTML pages. Each HTML page usually has a number of Web objects on each page such as graphics, text, and "Hyper-Text" references (URL's) to other HTML pages. For example, a user may wish to collect information from three different sources. Each of these sources may potentially maintain information in a different format. For instance, one source may be a database, a second may be a spreadsheet, and a third may be a Web page. There is also a need to identify and retrieve dynamically updated content from these diverse network sources.

One mechanism for providing access to personalized information is a "portal". Corporate portals or enterprise information portals (EIPs) have many uses and advantages, but the most common overarching task of any portal is to provide users with efficient access to personalized information and applications. For an internal network, this can mean employee information such as retirement account balances and vacation requests. It may also include sales force automation and enterprise resource planning (ERP) applications. Externally, portals can collect and make information available to third parties such as business partners and customers. Portals can be used to simplify customer support, drive e-business, and/or accelerate content distribution.

A basic portal assembles static information in a single browser page for employee or customer use. Typically, static content is retrieved and placed into a giant repository which maintains all of the information used in the portal. The information is then reformatted and published to users of the portal. However managing a huge repository of content presents a number of difficulties to the organization operating the portal. One problem is that some types of information must be constantly updated. For example, stock prices or weather reports change regularly and frequently.

Another problem with information content retrieved via the Internet is that much of the information is not in a structured format. The data is not formatted in tables and rows like information stored in a database system. Instead, most of the information is unstructured or semi-structured data.

What is needed is a solution that enables user to capture dynamic content from a variety of sources such as Web pages, databases, and XML documents. The solution should provide an easy-to-use and flexible means to extract and aggregate data from content captured from various sources. Ideally, the solution should enable useful data to be extracted from dynamic content available from a data source and aggregated with other information. The present invention provides a solution for these and other needs.

SUMMARY OF INVENTION

A system and methodology for extraction and aggregation of data from dynamic content is described. In one embodiment, for example, a method of the present invention is described for extracting and structuring items of data from content available via the Internet, the method comprises steps of: receiving input of a user specifying at least one source of content available via the Internet, types of data to be extracted from the at least one source, and fields for structuring extracted items of data; retrieving content from the at least one source; parsing the retrieved content to extract items of data of the types specified by the user; and mapping the extracted items of data to the fields specified by the user so as to transform the extracted items of data into a structured format.

BRIEF DESCRIPTION OF DRAWINGS

FIGS. 11A-G are a series of screen shots illustrating several screens of the user interface of the currently preferred embodiment of the DataParts system.

DETAILED DESCRIPTION

Glossary

Figure 1:
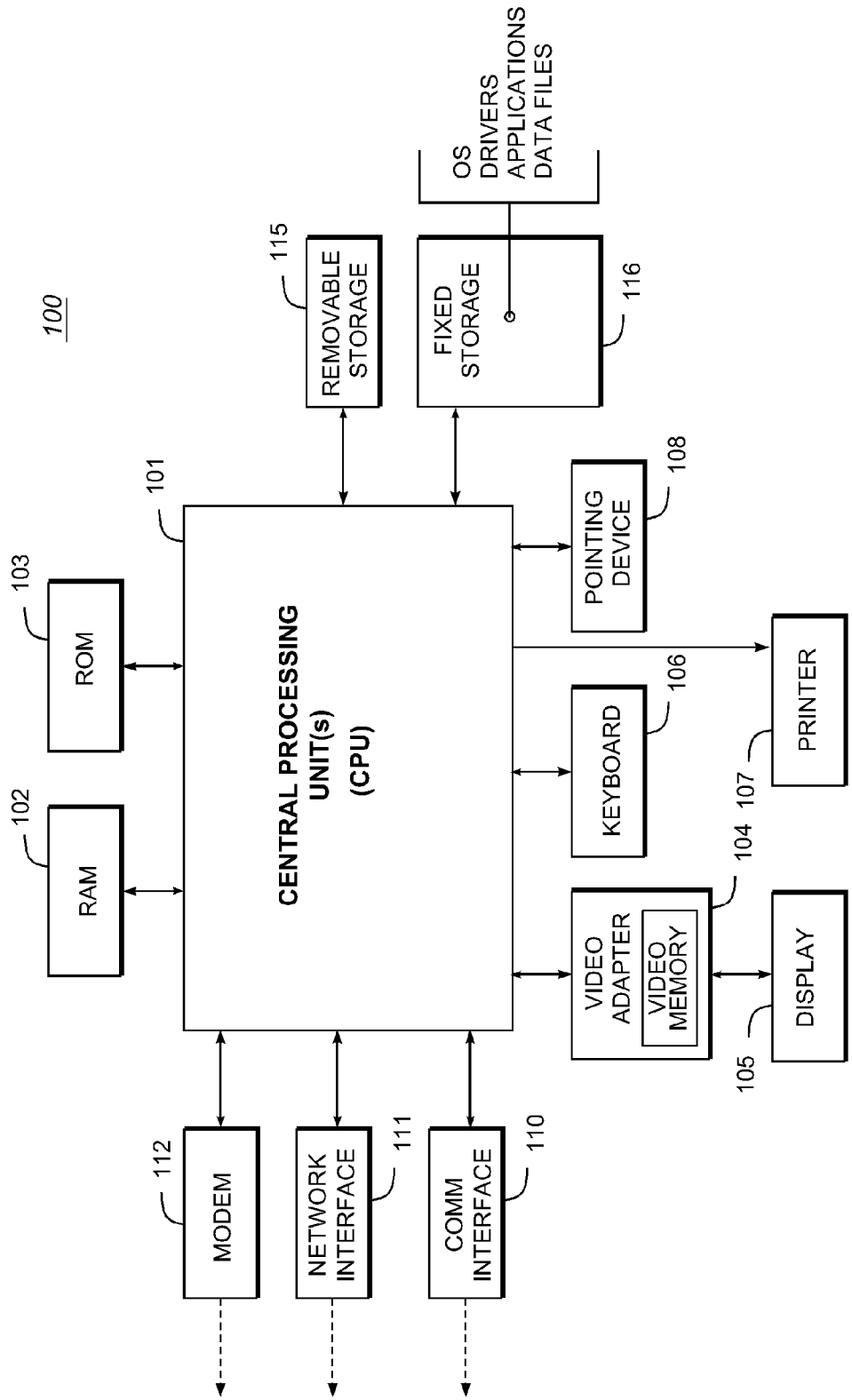
FIG. 1 is a very general block diagram of a computer system (e.g., an IBM-compatible system) in which software-implemented processes of the present invention may be embodied.

The following definitions are offered for purposes of illustration, not limitation, in order to assist with understanding the discussion that follows.

Bytecode: A virtual machine executes virtual machine low-level code instructions called bytecodes. Both the Sun Microsystems Java virtual machine and the Microsoft .NET virtual machine provide a compiler to transform the respective source program (i.e., ajava program or a C# program, respectively) into virtual machine bytecodes.

cHTML: Short for compact HTML, cHTML is a subset of HTML for small information devices, such as smart phones and PDAs. cHTML is essentially a pared down version of regular HTML. Because small devices such as cellular phones have hardware restrictions such as small memory, low power CPUs, limited or no storage capabilities, small mono-color display screens, single-character font and restricted input methods (the absence of a keyboard or a mouse), cHTML provides a simpler form of HTML for use with such devices.

HTML: HTML stands for HyperText Markup Language, the authoring language used to create documents on the World Wide Web. HTML defines the structure and layout of a Web document by using a variety of tags and attributes. For further description of HTML, see e.g., "HTML 4.01 Specification", a World Wide Web consortium recommendation dated Dec. 24, 1999, the disclosure of which is hereby incorporated by reference. A copy of this specification is available via the Internet (e.g., currently at www.w3.org/TR/REC-html40).

HTTP: HTTP is the acronym for HyperText Transfer Protocol, which is the underlying communication protocol used by the World Wide Web on the Internet. HTTP defines how messages are formatted and transmitted, and what actions Web servers and browsers should take in response to various commands. For example, when a user enters a URL in his or her browser, this actually sends an HTTP command to the Web server directing it to fetch and transmit the requested Web page. Further description of HTTP is available in "RFC 2616: Hypertext Transfer Protocol—HTTP/1.1," the disclosure of which is hereby incorporated by reference. RFC 2616 is available from the World Wide Web Consortium (W3C), and is available via the Internet (e.g., currently at www.w3.org/Protocols/). Additional description of HTTP is available in the technical and trade literature, see e.g., Stallings, W., "The Backbone of the Web," BYTE, October 1996, the disclosure of which is hereby incorporated by reference.

Java: Java is a general purpose programming language developed by Sun Microsystems. Java is an object-oriented language similar to C++, but simplified to eliminate language features that cause common programming errors. Java source code files (files with a .java extension) are compiled into a format called bytecode (files with a .class extension), which can then be executed by a Java interpreter. Compiled Java code can run on most computers because Java interpreters and runtime environments, known as Java virtual machines (VMs), exist for most operating systems, including UNIX, the Macintosh OS, and Windows. Bytecode can also be converted directly into machine language instructions by a just-in-time (JIT) compiler. Further description of the Java Language environment can be found in the technical, trade, and patent literature; see e.g., Gosling, J. et al., "The Java Language Environment: A White Paper," Sun Microsystems Computer Company, October 1995, the disclosure of which is hereby incorporated by reference. For additional information on the Java programming language (e.g., version 2), see e.g., "Java 2 SDK, Standard Edition Documentation, version 1.4.2," from Sun Microsystems, the disclosure of which is hereby incorporated by reference. A copy of this documentation is available via the Internet (e.g., currently at java.sun.com/j2se/1.4.2/docs/index.html).

JavaScript: JavaScript was designed by Netscape as an easy-to-use object-oriented scripting language that serves as an adjunct to the Java programming language. JavaScript is a small, lightweight language that is designed to be embedded in other products and applications, such as Web browsers. Inside a host environment, JavaScript can be connected to the objects of its environment to provide programmatic control over such objects. JavaScript code can be added to standard HTML pages to create interactive documents and has found considerable use in the creation of interactive Web-based forms. Most modern browsers, including those from Microsoft and Netscape, contain JavaScript support. For additional information on JavaScript, see e.g., "Core JavaScript Guide 1.5", from Netscape, the disclosure of which is hereby incorporated by reference. A copy of this documentation is available via the Internet (e.g., currently at devedge. netscape.com).

Network: A network is a group of two or more systems linked together. There are many types of computer networks, including local area networks (LANs), virtual private networks (VPNs), metropolitan area networks (MANs), campus area networks (CANs), and wide area networks (WANs) including the Internet. As used herein, the term "network" refers broadly to any group of two or more computer systems or devices that are linked together from time to time (or permanently).

Portal: A portal provides an individualized or personalized view of multiple resources (e.g., Web sites) and services. A portal typically offers a single access point (e.g., browser page) providing access to a range of information and applications. A portal assembles information from a number of different sources (e.g., Web sites and applications) enabling a user to quickly receive information without having to navigate to a number of different Web sites. A portal also typically enables a user to obtain a personalized view of information and applications by organizing and grouping information and services for presentation to users. A portal may be considered to be composed of one or more portlets as defined below.

Portlet: A portlet is an object that is responsible for capturing and delivering information to a portal from a specific source. One or more individual portlets may then be organized on a Web page to create a portal for viewing by users using a browser. Information that may be captured by a portlet may include a Web page or portion of a Web page (e.g., collected from the World Wide Web), data retrieved from a database, flat files (e.g., spreadsheet data and documents), and/or information collected from custom interfaces to applications (e.g., information collected from an application via a Common Gateway Interface). For further information regarding portlets and portals, see e.g., "JSR168: Portlet Specification", the disclosure of which is hereby incorporated by reference. A copy of this specification is available via the Internet (e.g., currently at www.jcp.org).

TCP: TCP stands for Transmission Control Protocol. TCP is one of the main protocols in TCP/IP networks. Whereas the IP protocol deals only with packets, TCP enables two hosts to establish a connection and exchange streams of data. TCP guarantees delivery of data and also guarantees that packets will be delivered in the same order in which they were sent. For an introduction to TCP, see e.g., "RFC 793: Transmission Control Program DARPA Internet Program Protocol Specification", the disclosure of which is hereby incorporated by reference. A copy of RFC 793 is available via the Internet (e.g., currently at www.ietf.org/rfc/rfc793.txt).

TCP/IP: TCP/IP stands for Transmission Control Protocol/Internet Protocol, the suite of communications protocols used to connect hosts on the Internet. TCP/IP uses several protocols, the two main ones being TCP and IP. TCP/IP is built into the UNIX operating system and is used by the Internet, making it the de facto standard for transmitting data over networks. For an introduction to TCP/IP, see e.g., "RFC 1180: A TCP/IP Tutorial", the disclosure of which is hereby incorporated by reference. A copy of RFC 1180 is available via the Internet (e.g., currently at www.ietf.org/rfc/rfc1180.txt).

URL: URL is an abbreviation of Uniform Resource Locator, the global address of documents and other resources on the World Wide Web. The first part of the address indicates what protocol to use, and the second part specifies the IP address or the domain name where the resource is located.

XHTML: Short for Extensible Hypertext Markup Language, a hybrid between HTML and XML. XHTML is a family of current and future document types and modules that reproduce, subset, and extend HTML 4. XHTML family document types are XML based, and ultimately are designed to work in conjunction with XML-based user agents.

XML: Short for Extensible Markup Language, a specification developed by the W3C. XML is a pared-down version of SGML, designed especially for Web documents. It allows designers to create their own customized tags, enabling the definition, transmission, validation, and interpretation of data between applications and between organizations. For further description of XML, see, e.g., Extensible Markup Language (XML) 1.0 specification which is available from the World Wide Web Consortium (www.w3.org), the disclosure of which is hereby incorporated by reference. The specification is also available on the Internet (e.g., currently at www.w3.org/TR/REC-xml).

INTRODUCTION

Referring to the figures, exemplary embodiments of the invention will now be described. The following description will focus on the presently preferred embodiment of the present invention, which is implemented in desktop and/or server software (e.g., driver, application, or the like) operating in an Internet-connected environment running under an operating system, such as the Microsoft Windows operating system. The present invention, however, is not limited to any one particular application or any particular environment. Instead, those skilled in the art will find that the system and methods of the present invention may be advantageously embodied on a variety of different platforms, including Macintosh, Linux, Solaris, UNIX, FreeBSD, and the like. Therefore, the description of the exemplary embodiments that follows is for purposes of illustration and not limitation. The exemplary embodiments are primarily described with reference to block diagrams or flowcharts. As to the flowcharts, each block within the flowcharts represents both a method step and an apparatus element for performing the method step. Depending upon the implementation, the corresponding apparatus element may be configured in hardware, software, firmware or combinations thereof.

COMPUTER-BASED IMPLEMENTATION

Basic System Hardware (e.g., for Desktop and Server Computers)

The present invention may be implemented on a conventional or general-purpose computer system, such as an IBM-compatible personal computer (PC) or server computer. FIG. 1 is a very general block diagram of a computer system (e.g., an IBM-compatible system) in which software-implemented processes of the present invention may be embodied. As shown, system 100 comprises a central processing unit(s) (CPU) or processor(s) 101 coupled to a random-access memory (RAM) 102, a read-only memory (ROM) 103, a keyboard 106, a printer 107, a pointing device 108, a display or video adapter 104 connected to a display device 105, a removable (mass) storage device 115 (e.g., floppy disk, CD-ROM, CD-R, CD-RW, DVD, or the like), a fixed (mass) storage device 116 (e.g., hard disk), a communication (COMM) port(s) or interface(s) 110, a modem 112, and a network interface card (NIC) or controller 111 (e.g., Ethernet). Although not shown separately, a real time system clock is included with the system 100, in a conventional manner.

CPU 101 comprises a processor of the Intel Pentium family of microprocessors. However, any other suitable processor may be utilized for implementing the present invention. The CPU 101 communicates with other components of the system via a bi-directional system bus (including any necessary input/output (I/O) controller circuitry and other "glue" logic). The bus, which includes address lines for addressing system memory, provides data transfer between and among the various components. Description of Pentium-class microprocessors and their instruction set, bus architecture, and control lines is available from Intel Corporation of Santa Clara, Calif. Random-access memory 102 serves as the working memory for the CPU 101. In a typical configuration, RAM of sixty-four megabytes or more is employed. More or less memory may be used without departing from the scope of the present invention. The read-only memory (ROM) 103 contains the basic input/output system code (BIOS)—a set of low-level routines in the ROM that application programs and the operating systems can use to interact with the hardware, including reading characters from the keyboard, outputting characters to printers, and so forth.

Mass storage devices 115, 116 provide persistent storage on fixed and removable media, such as magnetic, optical or magnetic-optical storage systems, flash memory, or any other available mass storage technology. The mass storage may be shared on a network, or it may be a dedicated mass storage. As shown in FIG. 1, fixed storage 116 stores a body of program and data for directing operation of the computer system, including an operating system, user application programs, driver and other support files, as well as other data files of all sorts. Typically, the fixed storage 116 serves as the main hard disk for the system.

In basic operation, program logic (including that which implements methodology of the present invention described below) is loaded from the removable storage 115 or fixed storage 116 into the main (RAM) memory 102, for execution by the CPU 101. During operation of the program logic, the system 100 accepts user input from a keyboard 106 and pointing device 108, as well as speech-based input from a voice recognition system (not shown). The keyboard 106 permits selection of application programs, entry of keyboard-based input or data, and selection and manipulation of individual data objects displayed on the screen or display device 105. Likewise, the pointing device 108, such as a mouse, track ball, pen device, or the like, permits selection and manipulation of objects on the display device. In this manner, these input devices support manual user input for any process running on the system.

The computer system 100 displays text and/or graphic images and other data on the display device 105. The video adapter 104, which is interposed between the display 105 and the system's bus, drives the display device 105. The video adapter 104, which includes video memory accessible to the CPU 101, provides circuitry that converts pixel data stored in the video memory to a raster signal suitable for use by a cathode ray tube (CRT) raster or liquid crystal display (LCD) monitor. A hard copy of the displayed information, or other information within the system 100, may be obtained from the printer 107, or other output device. Printer 107 may include, for instance, an HP Laserjet printer (available from Hewlett Packard of Palo Alto, Calif.), for creating hard copy images of output of the system.

The system itself communicates with other devices (e.g., other computers) via the network interface card (NIC) 111 connected to a network (e.g., Ethernet network, Bluetooth wireless network, or the like), and/or modem 112 (e.g., 56K baud, ISDN, DSL, or cable modem), examples of which are available from 3Com of Santa Clara, Calif. The system 100 may also communicate with local occasionally-connected devices (e.g., serial cable-linked devices) via the communication (COMM) interface 110, which may include a RS-232 serial port, a Universal Serial Bus (USB) interface, or the like. Devices that will be commonly connected locally to the interface 110 include laptop computers, handheld organizers, digital cameras, and the like.

IBM-compatible personal computers and server computers are available from a variety of vendors. Representative vendors include Dell Computers of Round Rock, Tex., Hewlett-Packard of Palo Alto, Calif., and IBM of Armonk, N.Y. Other suitable computers include Apple-compatible computers (e.g., Macintosh), which are available from Apple Computer of Cupertino, Calif., and Sun Solaris workstations, which are available from Sun Microsystems of Mountain View, Calif.

Basic System Software

Figure 2:
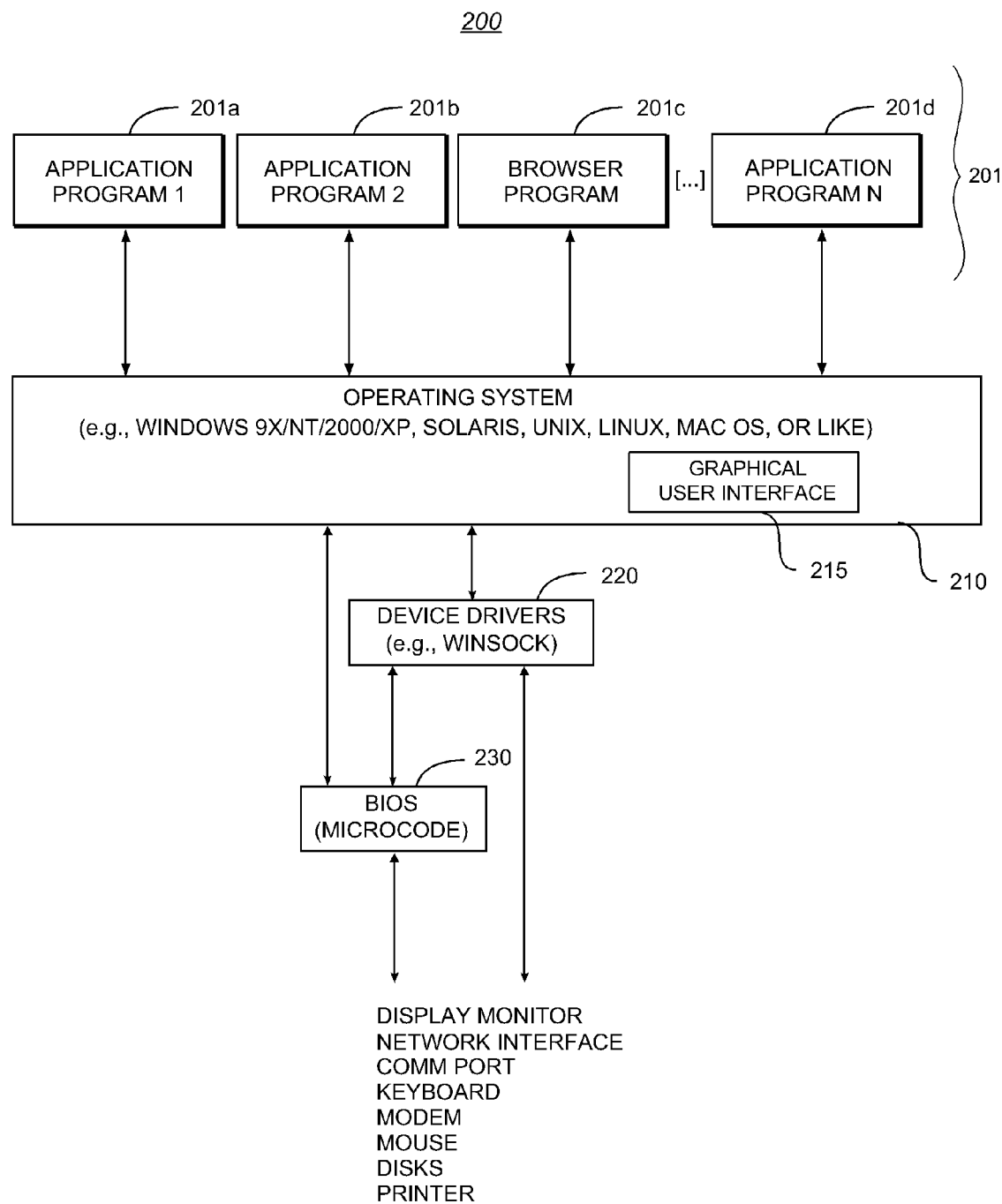
FIG. 2 is a block diagram of a software system for controlling the operation of the computer system.

FIG. 2 is a block diagram of a software system for controlling the operation of the computer system 100. As shown, a computer software system 200 is provided for directing the operation of the computer system 100. Software system 200, which is stored in system memory (RAM) 102 and on fixed storage (e.g., hard disk) 116, includes a kernel or operating system (OS) 210. The OS 210 manages low-level aspects of computer operation, including managing execution of processes, memory allocation, file input and output (I/O), and device I/O. One or more application programs, such as client application software or "programs" 201 (e.g., 201a, 201b, 201c, 201d) may be "loaded" (i.e., transferred from fixed storage 116 into memory 102) for execution by the system 100. The applications or other software intended for use on the computer system 100 may also be stored as a set of down-loadable processor-executable instructions, for example, for downloading and installation from an Internet location (e.g., Web server).

System 200 includes a graphical user interface (GUI) 215, for receiving user commands and data in a graphical (e.g., "point-and-click") fashion. These inputs, in turn, may be acted upon by the system 100 in accordance with instructions from operating system 210, and/or client application module(s) 201. The GUI 215 also serves to display the results of operation from the OS 210 and application(s) 201, whereupon the user may supply additional inputs or terminate the session. Typically, the OS 210 operates in conjunction with device drivers 220 (e.g., "Winsock" driver—Windows' implementation of a TCP/IP stack) and the system BIOS microcode 230 (i.e., ROM-based microcode), particularly when interfacing with peripheral devices. OS 210 can be provided by a conventional operating system, such as Microsoft Windows 9x, Microsoft Windows NT, Microsoft Windows 2000, or Microsoft Windows XP, all available from Microsoft Corporation of Redmond, Wash. Alternatively, OS 210 can also be an alternative operating system, such as the previously mentioned operating systems.

The above-described computer hardware and software are presented for purposes of illustrating the basic underlying desktop and server computer components that may be employed for implementing the present invention. For purposes of discussion, the following description will present examples in which it will be assumed that there exists a "server" (e.g., Web server) that communicates with one or more "clients" (e.g., desktop computers, laptop computers, notebook computers, handheld computers, "smart phones", personal digital assistants (PDAs), and/or other computing devices). The following discussion also uses examples of Web pages implemented using HTML; however, the present invention may also be used in conjunction with Web pages written in various other markup languages, including, but not limited to, cHTML, XML, and XHTML. The present invention, however, is not limited to any particular environment or device configuration. In particular, a client/server distinction is not necessary to the invention, but is used to provide a framework for discussion. Instead, the present invention may be implemented in any type of system architecture or processing environment capable of supporting the methodologies of the present invention presented in detail below.

CONTENT COLLECTION AND FEATURE EXTRACTION

Overview of Content Collection and Feature Extraction

The present invention comprises systems and methods to facilitate the collection and distribution of information over a computer network. This invention solves several information management problems, such as the marking of content distributed over a network, the instant display of current information distributed over a network, and the retrieval of information at a browser without an intermediary step to save the information. As such, the invention enables customized aggregation of content distributed over a network in real-time.

The invention enables users to simultaneously view not only their favorite Web sites, but also their favorite parts of their favorite Web sites, all within a single window. Individual users may employ the invention to collect portions or individual Web pages which may be located at any Web site. Corporate Web designers and site managers can use this invention to mark and collect content from their own corporate intranet or from anywhere on the Web. Information aggregators may use this invention to collect Web-based information from one Web site or from many Web sites and "re-purpose" that content in a completely new form.

The invention may also be used to "post process" the results of any search engine to display only "quality" or "desired" information, thereby eliminating a need for additional user mouse clicks, and simplifying the search process while improving the quality of search results.

The invention is equally applicable to the collection and re-purposing of XML net objects as well as audio objects such as MP3. The invention also has applications on the Internet as well as conventional communications systems such as voice telephony and in broadband communications Embodiments of the invention include a recursive scripting language, or "Content Collection Language" (CCL), for identifying and accessing objects distributed over the Internet. In embodiments of the invention, short scripts written in the scripting language are used in place of URLs: unlike URLs, which are designed for referencing static data, scripts written in the Content Collection Language may point to "dynamic" data that is constantly updated. The CCL statement can be used just like a URL.

Embodiments of the invention include a Feature Extraction object used for identifying similar information objects. The invention makes it possible to divide and sort page contents from several pages into groups sharing similar attributes, which are contained in a Feature Extraction object. In this way information brokers and publishers can aggregate information from several sources into a new information object.

The invention includes systems and methods for reducing a Web page to its smallest network objects and creating a Feature Extraction "tag" or "Web fingerprint" of the object; this tag may be referenced again to find the object in the future. In embodiments of the invention, Feature Extraction uses "fuzzy logic" to ensure that targeted content is identified and collected after a source page has been updated with fresh information or graphics.

As such, Feature Extraction may be used to perform any one or more of the following:

Divide any Web page into its smallest parts or "atoms".

Given any desired object or its containers, to generate a symbolic "Internet fingerprint" that is persistent and may be used as an alias pointing to the target object.

Use the Internet fingerprint to find the desired object even though the static URLs on its page have changed.

Provide a resilient and robust "fingerprint" that can work well with missing rules.

Build a Feature Extraction tag of a target that is descriptive of its results and behavior (i.e., better knowledge representation.)

Produce a tag that will be consistent with the page being examined and the target object type over a vast majority of site/page combinations.

The invention provides a way to provide "version control" of the attribute tags as information changes and new types of Internet standards are adopted. By using this approach to version control, an information aggregation system can save an attribute tag and continue to update and extend its capturing and publishing system. While the system evolves, the older attribute tag will continue to point back accurately to the desired information recorded earlier. Web publishers can use Feature Extraction tags as an "alias" to information on a page that will allow them to identify and modify other areas on a page while maintaining the alias intact.

The invention is natural language neutral so that the software used to create an alias to an English information object can also be used to mark information objects in any language.

The list of attributes in a Feature Extraction object can be extended to include fuzzy patterns produced by a limited dictionary. For example, a limited dictionary for a university could include the terms: instructor, text, or fee. If these words are found within the context of a pattern match they can be included in the Feature Extraction attribute list. This part of the invention allows the user to develop extremely specific Feature Extraction objects for vertical subject domains in addition to the very general or horizontal approach used without domain dictionaries.

In embodiments of the invention, the Feature Extraction tag may be used to accurately "rank" information objects within a collection of objects in a database or on a page. For example, a page can be divided into information objects, and the user will be shown only the "most important" objects on the page. A search engine can use this ability to do a standard lexical search and subsequently return only the most important information objects of the search results. For example, links returned by a search engine may be examined using the Feature Extraction technology of this invention to parse each search result page into atoms and subsequently score the page for its quality content. Depending on the content score, different Feature Extraction objects are used to collect data from the page. In one embodiment, a page with a high "headline" score will be parsed and displayed using a headline capture process. A page with a high text score may be displayed using an "article" capture object. A high graphic score may be displayed by use of a graphic capture object.

The invention provides a method and system for collecting and displaying information that has been collected from the Internet: some embodiments are divided into the "collection system" and the "display system".

The collection system allows a user to use a Web browser application to navigate to a Web page on the Internet and then "mark" content. When the user desires to capture an object from the Web he or she will enter "navigation" mode. In navigation mode, as the user clicks on hypertext links on a page the invention process will record every action. The user will continue to navigate until he or she reaches the page that contains the desired target content. Once the desired content is visible within the browser the user can click on a "stop recording" button. The system will display a number of selections to the user who may select "Text Article", "Images", "Numeric Table", or "Headlines" from the target page. If "Headlines" are selected, all of the headlines are collected from the page and displayed on the preview page. If "Images" are selected, all of the images from the page are collected and displayed on the preview page. These and other embodiments are described in greater detail herein.

Content Collection Language

The invention includes a recursive scripting language referred to as a "Content Collection Language" (CCL). The Content Collection Language is a dynamic language, in contrast to "static" languages that have a fixed list of keywords. As such, interpretation of a dynamic language, such as the Content Collection Language, employs only the code required for interpreting the individual commands present in a script and not the totality of commands in the language. For example, in the Content Collection Language, interpretation of a command such as "LOAD( )" does not require loading all of the unused key-words simply to execute the command, as in this case, to load a document.

In embodiments of the invention, the Content Collection Language is implemented in the JAVA programming language from Sun Microsystems, Inc. of Palo Alto, Calif. In embodiments of the invention, the Content Collection Language employs the capacity to instantiate a class dynamically to implement the various commands in the Content Collection Language. Thus a command can register additional commands that it may require in its execution dynamically.

In embodiments of the invention, a script written in the Content Collection Language may be interpreted over a distributed set of processors. For instance, a portion of a script may be executed at a client browser, while another portion of the script may be executed at a server coupled to the client via the Internet. In embodiments of the invention in which the Content Collection Language is implemented in the JAVA programming language, a script encoded in the Content Collection Language may be processed on any Java server, as part of one or more Java servlets.

Format of Commands in the Content Collection Language

The Content Collection Language is a recursive, object-oriented scripting language. Commands and parameters in the language are treated identically, and commands are executed in the order in which they are nested. Each command is made up of three parts, the Command Name, the Params, and the Next Command:

CCL_COMMAND(param1,param2(CCL_NEXT (XXXXXXXXXXX XXXXXXX))

In the above example, "CCL_COMMAND" is the Command Name. The local parameters are in the parenthesis: "(param1,param2). The Next Command is "CCL_NEXT". "(XXXXXXXXXXXXXXXXXX)" represents a String Artifact.

When each CCL_COMMAND is run it will:

Parse and save the local parameters

Parse the name of the Next Command and instantiate the Next Command

Pass the "String Artifact" to the Next Command

The following example illustrates a script in the Content Collection Language including three nested commands:

CCL_COMMAND(param1(CCL_NEXT(param2 (CCL_LAST(para m3,void)))))

This command may be viewed as it would be executed as a structured programming language:

```
1: CCL_COMMAND(param1(CCL_NEXT(param2(CCL_LAST(param3,void)))))
2: {
3:   save param1
4:   create CCL_NEXT
5:   CCL_NEXT(param2(CCL_LAST(param3,void))))
```

```
 6:    {
 7:      save param2
 8:      create CCL_LAST
 9:      CCL_LAST(param3,void)
10:      {
11:        Execute CCL_LAST and
12:        save data values in hashtable
13:        RETURN hashtable
14:      }
15:      Execute CCL_NEXT using
16: ....hashtable results from CCL_LAST
17:      add new data and RETURN hashtable
18:    }
19:    Execute CCL_COMMAND using hashtable results
20:    from CCL_NEXT and RETURN hashtable
21:    results to creator
22: }
```

Processing does not take place until all CCL_COMMANDS have been created. The "most nested" command is processed first and returns its results to its creator. Each command is executed using the results from its "nested child" until the final result is returned to its creator.

Commands are "chained" to obtain specific content results:

LABEL(param1,param2,param3(LABELTWO (param2.1,param2,2( ))

The result is a single string command which can be used in a manner similar to a URL to describe content anywhere on the Web. To illustrate, consider a script encoded in the Content Collection Language for retrieving a graphic from a financial news site:

GRAPHIC((ANCHOR(/sandp.html(LOAD(foo_financial.com/markets /)))))

This description uses three commands to capture the S&P chart from the foo_financial.com page.

LOAD reads the foo_financial.com/markets/Web page

ANCHOR captures an anchor associated with "sandp.html"

GRAPHIC reads a graphic object when passed a URL

Using a standard scripting language, the script above may be written as follows:

```
1:  If LOAD("foofinancial.com/markets/")
2:
3:    {
4:      if(ANCHOR("sandp.html"))
5:
6:      {
7:        return (GRAPHICO);
8:      }
9:    }
```

The Content Collection Language executes the command that is most deeply nested first. If this is successful, the next most deeply nested command is executed until all of the commands have either returned an error message or executed successfully.

Once elementary commands are in place, they can be combined algebraically to produce additional commands in the Content Collection Language. Each command is made up of parameters and the Next Command to produce a third CCL command as a result. Each CCL command returns a collection of objects as a result of its parameters and the Next Command. For example, the CCL descriptor:

NEWSLIST((LOAD(foo_news.com))

returns a "collection" or list of all anchors separated by a delimiter that could be identified as a news list item.

Set operations in CCL include:

Union function: All elements of collection A that contain parameter B.

Exclusion function: All elements of collection A that do not contain parameter B.

Operations possible in CCL include:

BEFORE: Each element of collection A that are BEFORE parameter B.

AFTER: Each element of collection A that are AFTER parameter B.

FIRST: First element of a collection A.

FIRSTNUM: First NUMBER of collection A.

LAST: Last element of a collection A.

LASTNUM: Last NUMBER of collection A.

CCL commands all share the same error handling and behave the same way during failure, pause, and retry situations.

Feature Extraction

The invention supports protocols and techniques for identifying information objects by use of attributes of the information objects. These protocols and techniques are collectively referred to as "Feature Extraction". A Feature Extraction tag of an information object comprises a number of "fuzzy rules" or attributes describing the information object. For instance, a Feature Extraction tag for a graphic object could be "G0ABMMZA001". The first character of the tag "G" defines the type of net object, with the character "G" being reserved for a graphic object. The second character "0" defines this tag as a graphics tag version "0" so that one can easily add or modify tags and maintain backward compatibility. The "ABMMZA" characters describe the capture attributes, and "001" is a numeral indicating the occurrence of the graphic object on the page. In this case "G0ABMMZA001" is the first occurrence of several "ABMMZA" objects on the page. The attributes are ranked with the most significant attribute left-most in the tag with "A" being the highest value and "Z" being the lowest value for any attribute.

Figure 3:
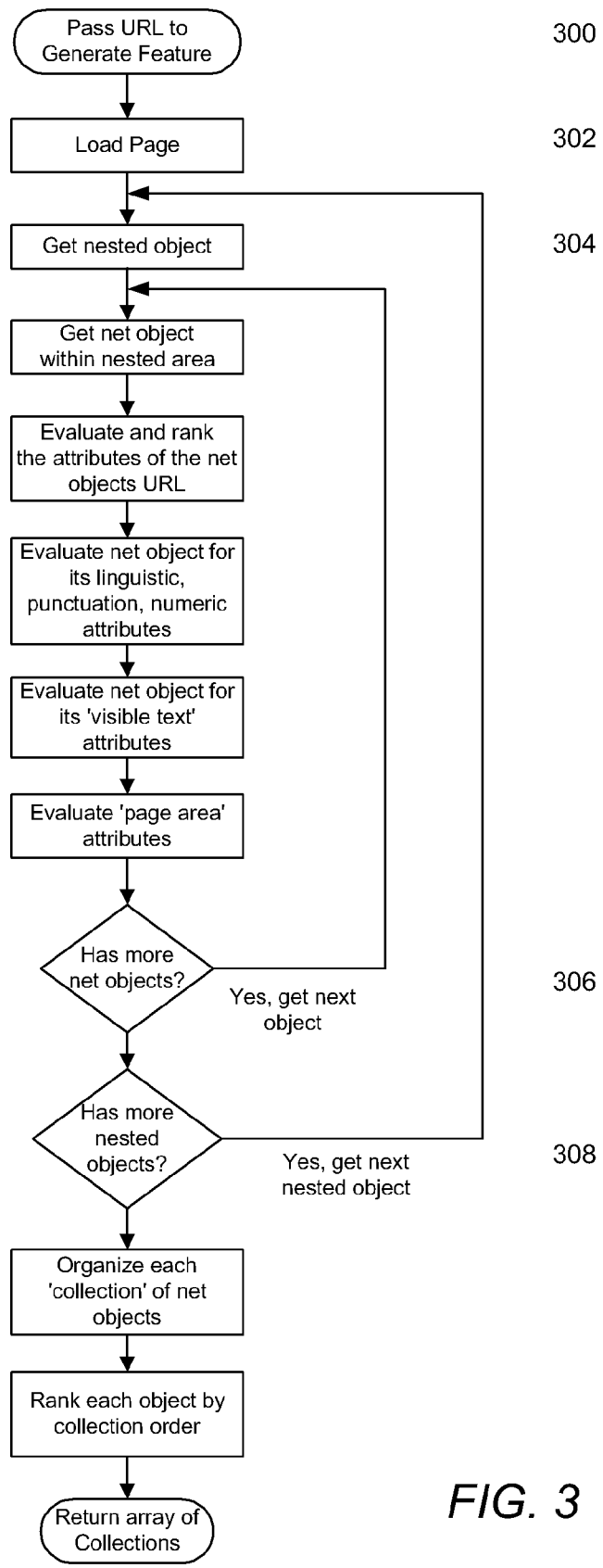
FIG. 3 is a flowchart for deconstructing a page retrieved from a network into a set of net objects.

For example, in FIG. 3, the URL 300 of a page is passed to the Feature Extraction indexer. The page is retrieved from the Web 302 and then each "container object" is analyzed or parsed one at a time 304. A container object for HTML is the TABLE tag that is used for page layout. Each TABLE tag may have many tables which, in turn, have nested tables of their own. Each container (TABLE) is separated from the target page into a new data object containing only information for that particular container. As each TABLE is parsed, objects in that table are created for each element of the TABLE such as, by way of a non-limiting example, a headline, graphic object, or button. Within each of these element tags is information that is used to produce the element's feature tag. A loop is used 306 to build all element tags within a container and another loop is used to build all container tags within a page 308.

Figure 4:
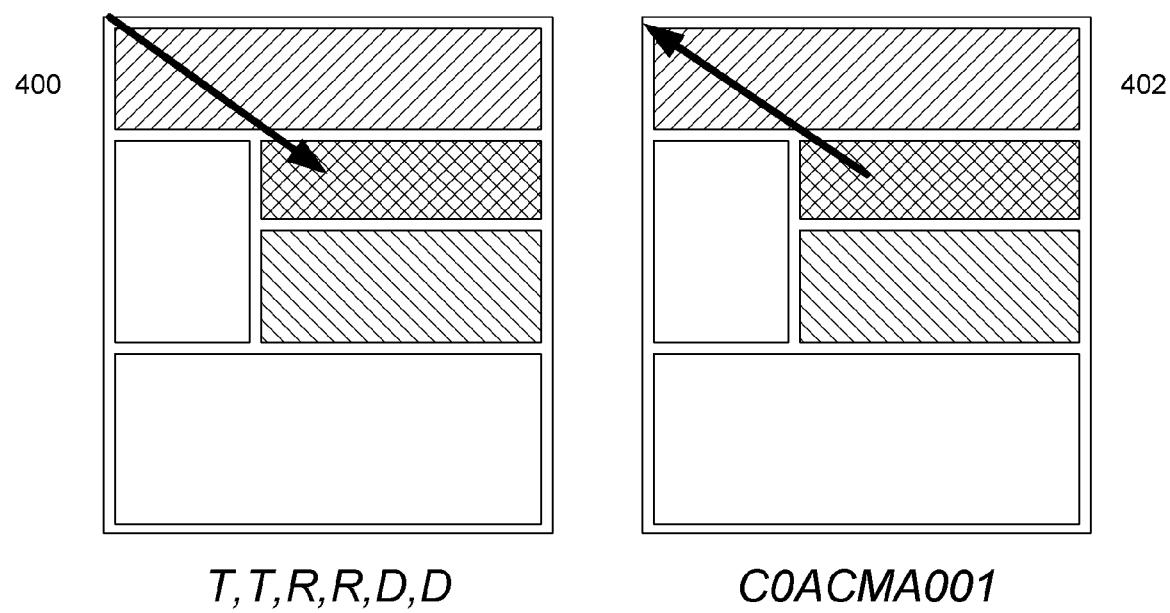
FIG. 4 illustrates an inside-out approach for building feature extraction attributes according to embodiments of the invention.

Feature extraction attributes are constructed using an "Inside->Out" method instead of an "Outside->In" approach. For example, FIG. 4 illustrates two pages 400, 402 with several tables. The left page 400 is tagged by building a list of table attributes from the top of the page to the desired capture target. In the approach used by this invention, illustrated on the right side of the diagram 402, the table attributes are limited to this particular table, or container, table, and its contents. The benefits of the "Inside->Out" approach of this invention are that advertising banners or other graphics can be added to the top or the bottom of the page, and the table, with its contents, can be moved, without disrupting the identification of the desired object. As long as the contents inside the table remain structurally unchanged the correct table for a generated tag will be collected. This allows capture tags to remain useful and accurate even when the pages are being modified by the publisher. This feature of the invention is commonly referred to as "persistence", and the approach used by this invention to mark and collect information is more "persistent" than other approaches in the prior art.

Feature extraction objects can be used to capture discrete net objects on a page such as a headline, graphic image, or button. Tags are also generated for distinct areas on the page, which may be a single container (TABLE), or an area made up of several nested containers.

Feature extraction tags can be combined to create more accurate and persistent tags for very complicated Web pages. For example, a container tag can be combined with any element tag (graphic, headline, form, etc.) to produce a very accurate extraction tag even for the most crowded of pages. In embodiments of the invention, the fuzzy logic of the attributes is used to extract an object using not only the content of the element itself (headline, graphic, button) but also the context of the element on the page. A situation where this is especially powerful is on very dense pages, such as a news portal, where there may be a large number of headlines that have very similar attributes. Another situation where the above technique can be used to retrieve data on the base of context is when extracting column and row data from a "spreadsheet" type of document on a page that has several "spreadsheet" displays of data. When creating the Feature Extraction tag, one may choose between a simple "element" tag or a "compound" tag, made up of a container tag and an element tag, depending on the page and the object being captured.

Figure 5:
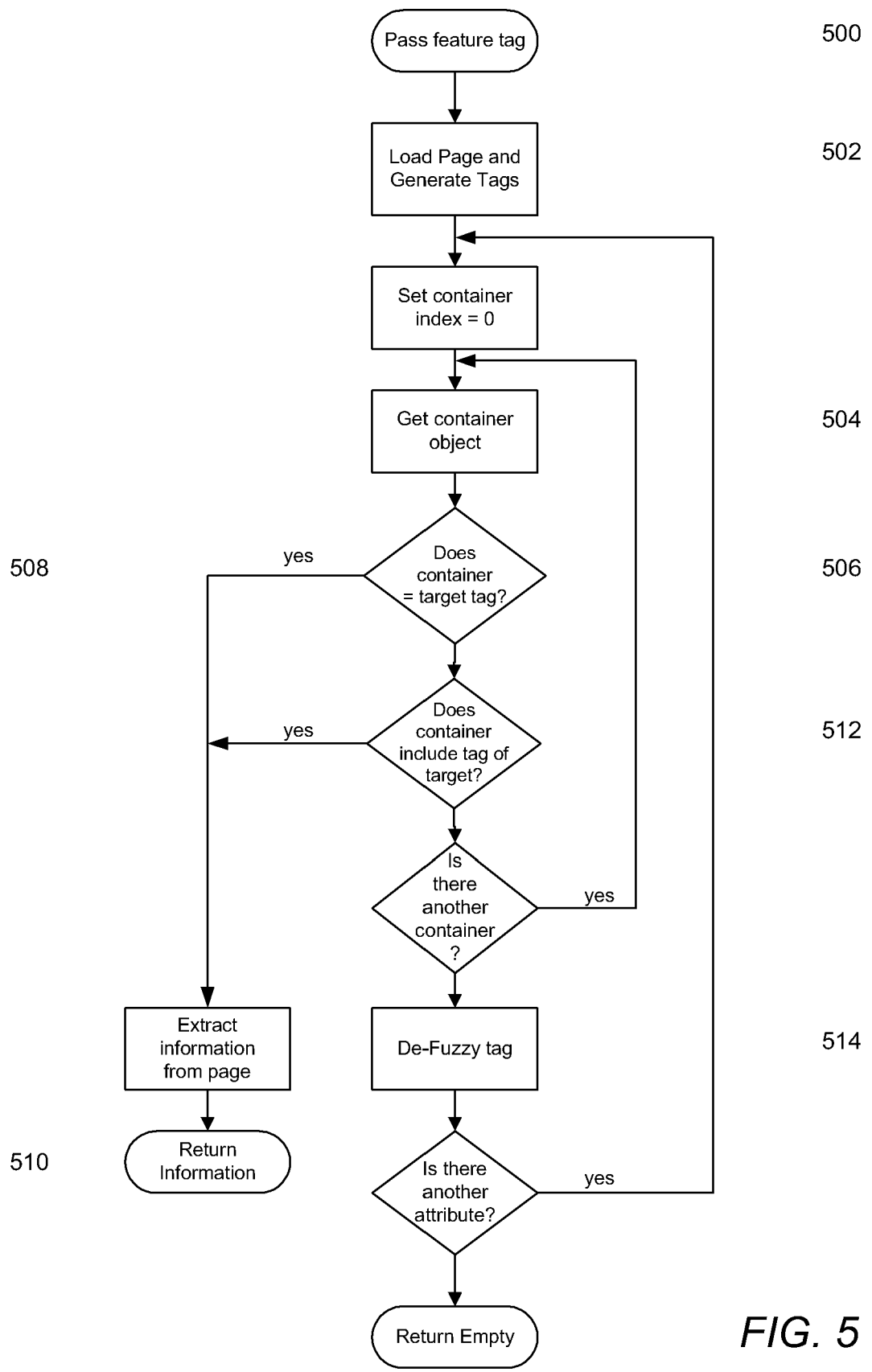
FIG. 5 illustrates a flow chart for identifying previously saved feature extraction objects.

The information retrieval processes of the present invention uses tags that have been generated previously to load a page of information and subsequently extract the desired information defined by the tag. Such a process is illustrated in FIG. 5. The URL of a page is passed with a "target" tag to the Feature Extraction indexer 500. The page is retrieved from the Web 502 and then each "container object" 504 is parsed one at a time. Each container is examined to see if "this container tag" equals the "target" tag 506. If this container matches the target 508 then the information within this container is returned to the caller 510. Next, the container is examined to see if the target tag is an element within that particular container 512. If an element matches the target tag, then that element's information is returned to the caller. If all containers on a page are examined without a match being found, this invention makes it possible to find the "nearest" object if an "exact" object match is not found. This is done by a "de-fuzzy" search 514 from the least significant (rightmost) attribute to the most significant (leftmost) of the attributes in a tag. For example, if an exact match were not found for the tag "G0ABMMZA001" the search would look for:

1: G0ABMMZB001,
2: G0ABMMZC001,
3: G0ABMMZD001,
4: G0ABMMZE001,
5: G0ABMMY*001,
6: G0ABMMX*001,
7: G0ABMMV*001,
8:,
9:,
10:,
11: G0AB***001

In effect, one searches right to left for the best fit, narrowing the search on the most significant attributes. The information retrieval module can be tuned for different solutions to provide a very fine or a very coarse fuzzy match of the tag to the target field. The tag notation of this invention also makes it possible to use wildcards to get all of the graphics from a page with a tag of "G0ABMMM**", and operators such as get all of the tags "greater than">G0ABMMZA.

Figure 6:
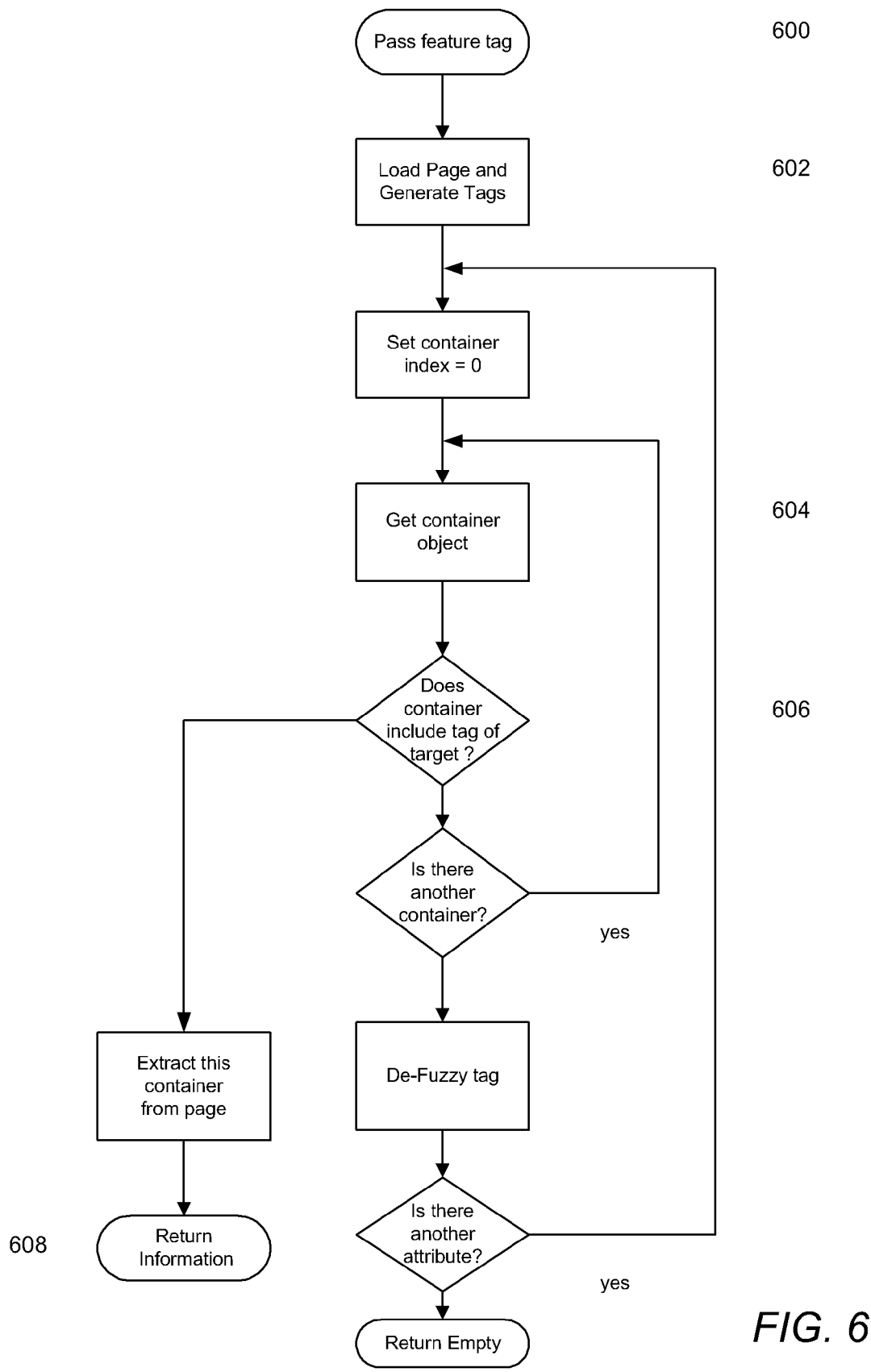
FIG. 6 is a flowchart for identifying a best-fit feature extraction object according to embodiments of the invention.

The Feature Extraction object has a "getContainer( )" method that will return any element's container. This feature is used on the "zoom-out" so the user can select the content (graphic, headline, button) or the desired context (area) at the same time. By passing a container tag, the target tag container's container will be returned. For example, in FIG. 6, the URL of a page is passed with a "target" tag 600 to the Feature Extraction "getContainer( )" method.

The page is retrieved from the Web 602 and then each "container object" is parsed one at a time 604. Each container is examined to see if the target tag is an element or a nested container within that particular container 606. If an element or nested container matches the target tag then that container's information is returned to the caller 608. If all containers on a page are examined without a match, the "nearest" object's container is returned.

This invention may also be used to "post-process" information in order to filter out undesired content from an otherwise good information retrieval. For example, a headline capture tag that collects all of the major headlines on a popular Web site may have some "navigation" or "site related" elements within that capture that are not desired when this information is added to an aggregated collection of headlines from multiple sites. Some examples of visible text that would not be desired when doing headline aggregation would be: "show more", "click here", "email to", etc. To subtract these kinds of text from a headline capture the following tag may be used:

L0TTTTTTTTTTT003HHHHHHHaaaaaaabbbbbbb

In this example, L0 is the headline tag list, TTTTTTTTTTT003 is the area in which the headlines are to be captured from, HHHHHHH is the tag for the desired headlines, and aaaaaaabbbbbbb instruct the indexer to remove headline type aaaaaaa and bbbbbbb from the collection. In other words, collect headlines HHHHHHH and remove from that capture headlines with a tag of aaaaaaa and bbbbbbb.

SYSTEM ARCHITECTURE

Figure 7:
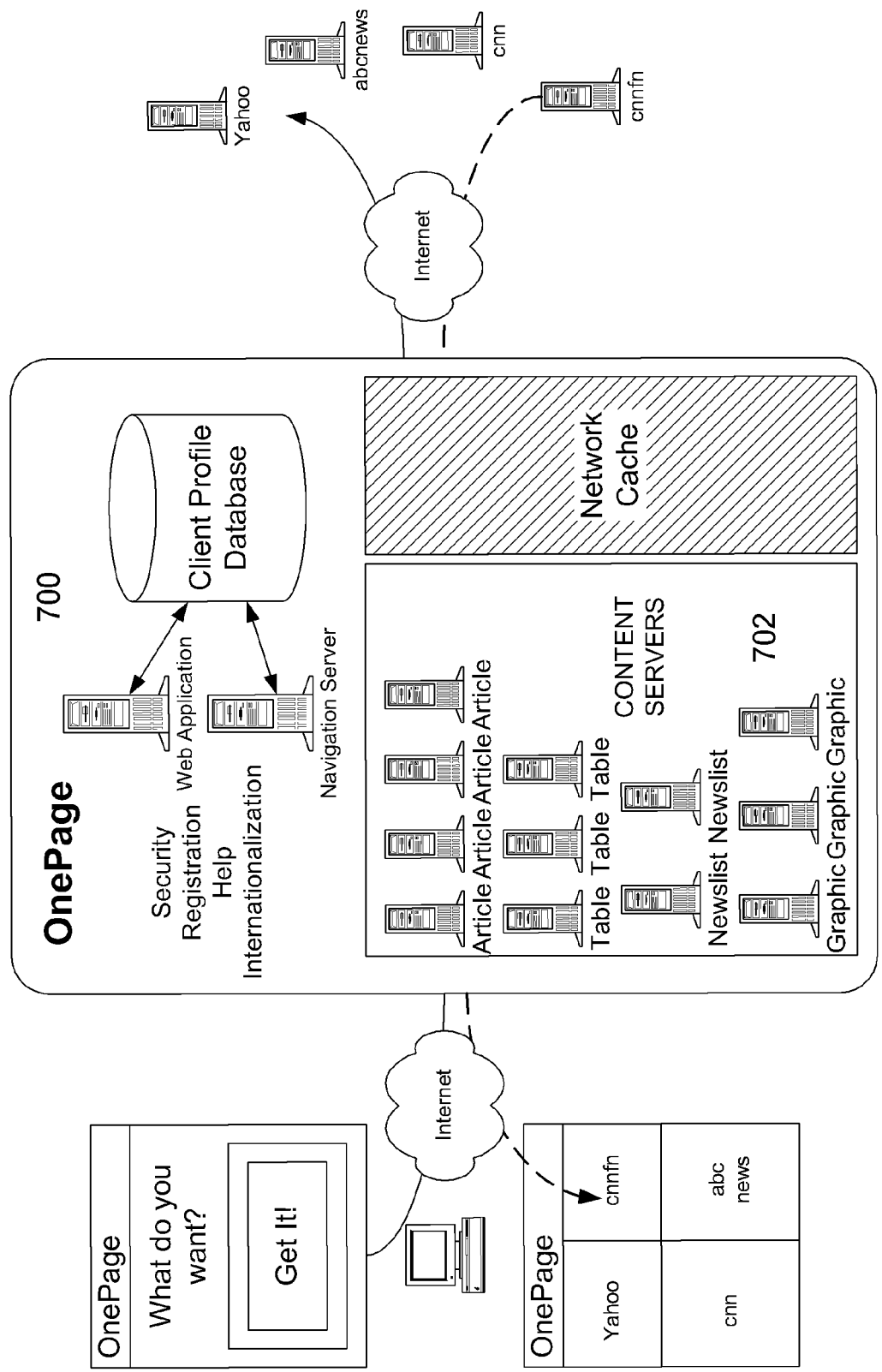
FIG. 7 illustrates a system architecture for an information retrieval system.

FIG. 7 illustrates the "portal" 700 and "content" 702 servers used in embodiments of the invention. User registration, password security, and internationalization are served by the portal server 700. The top part of FIG. 7 represents the "portal" server 700, with the "content" servers 702 in the lower half. In embodiments of the invention, each "content" server is as simple as possible and does not require access to the database with each content server specialized for a specific collection function,

GRAPHIC, ARTICLE, NEWLIST, TABLE

Figure 8A:
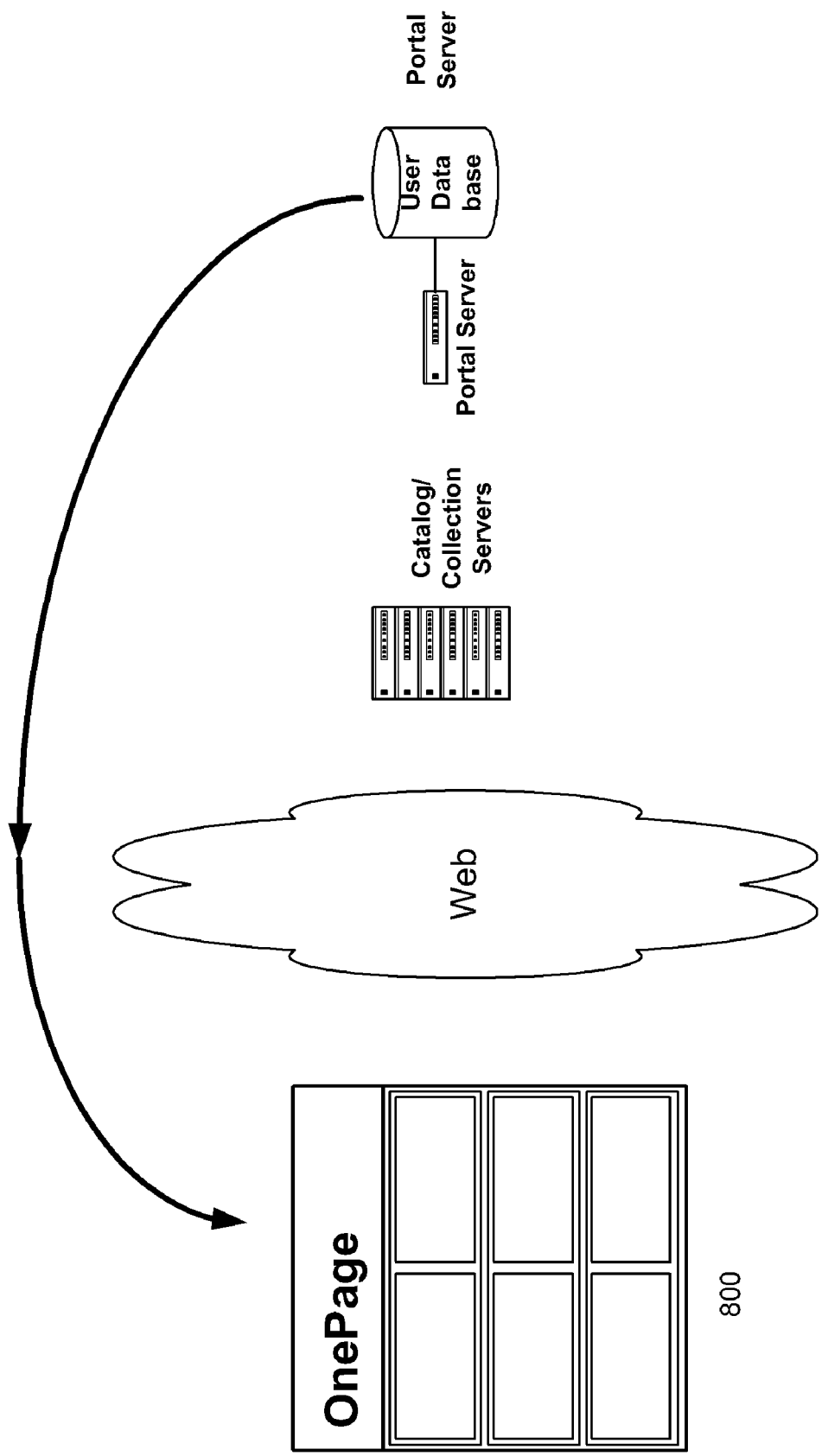
FIGS. 8A-8C illustrate a system architecture for retrieving multiple data sources into a single Web page.
Figure 8B:
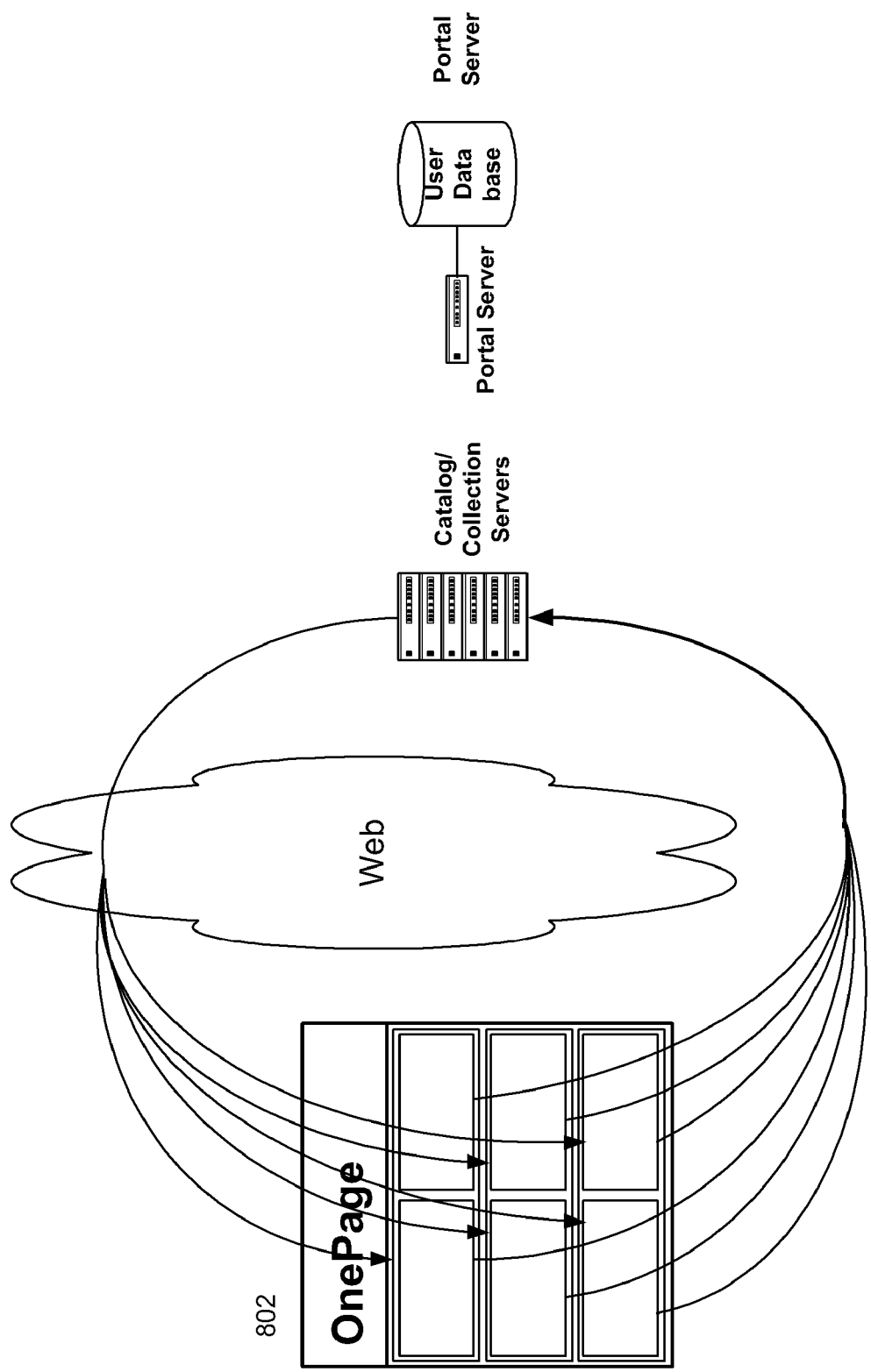

FIGS. 8A-B illustrate the process of delivering information in parallel. As the user logs into his or her account, a page is sent to the client Web browser 800. The Web page 800 at FIG. 8A does not contain all of the collected content when it is first drawn but will have a reference 802 at FIG. 8B to each "Webpart" to be collected in the window. These references are sent back to a cluster of content servers. Each content server is specialized to collect content quickly from each target site. In embodiments of the invention, the information is requested from each target site and then sent immediately to the user's Web page without being saved in a server database, cache, or repository.

Figure 8C:
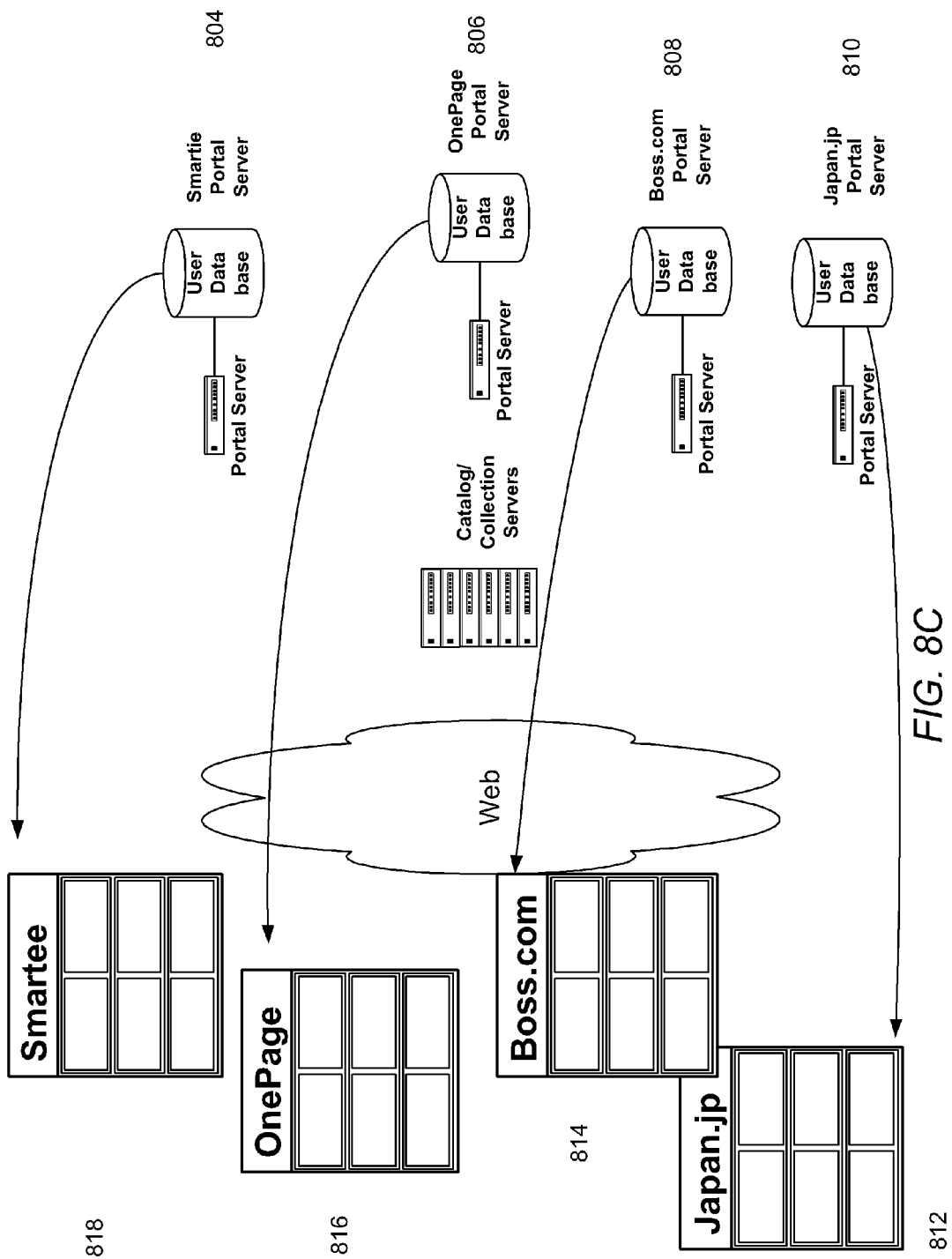

By separating the main page creation from the collection and delivery of information, this invention makes it possible to combine information from several sources residing on many different servers without delaying or halting the display of the main page. If an information source is unavailable, has a network error, or if the information source page has been redesigned, the rest of the main page will be displayed without interruption. At FIG. 8C, the separation of the main page server from the content servers also makes it possible for several "branded" servers 804, 806, 808, 810 to share the same content collection servers. Another advantage of this specialized server architecture is the ability to serve information to another portal server that is separated by physical distance and network address. For example, the four different portal servers 804-810 illustrated in FIG. 8C can be located across the world and have different user interfaces, languages, and features. The user's main page 812, 814, 816, 818 may look completely different from each of the portal servers 804-810 but the information servers will collect and deliver requested information using the same rack of collection servers, which may be located anywhere and shared by all configured portal servers 700 at FIG. 7.

Figure 9:
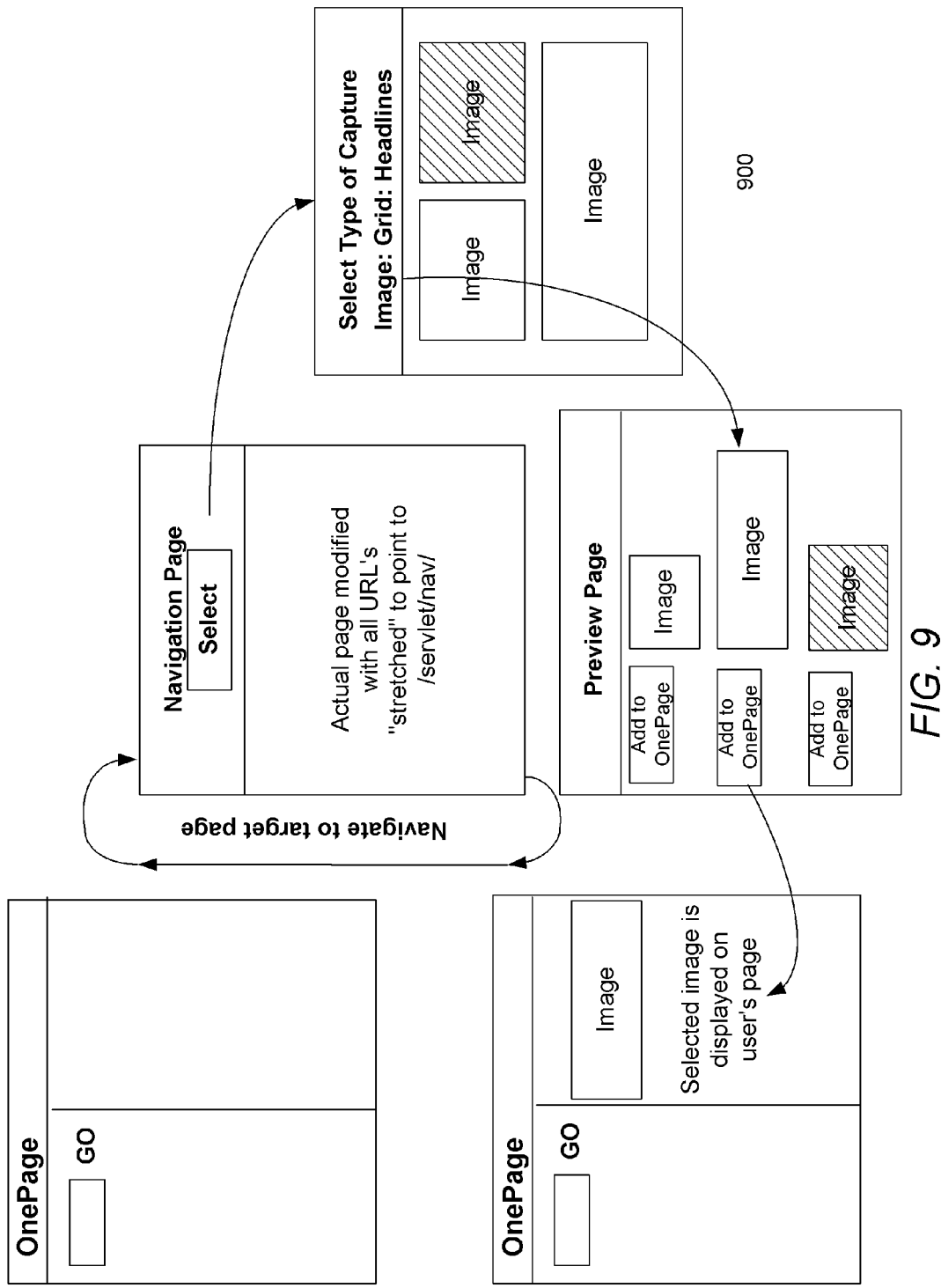
FIG. 9 illustrates a method of selecting information from Web sites for future retrieval.

Adding new information to a user's page can be accomplished by using this invention's "mark and collect" process 900, as illustrated in FIG. 9. After the user logs in to the portal server, he or she can begin "recording" the path to a desired net object by entering the start URL at a prompt window. During marking and navigation the user's browser screen is divided into two parts: the top frame contains a "stop recording" button and the lower frame on the screen displays the first page requested. The user is now in "navigation" mode.

Figure 10:
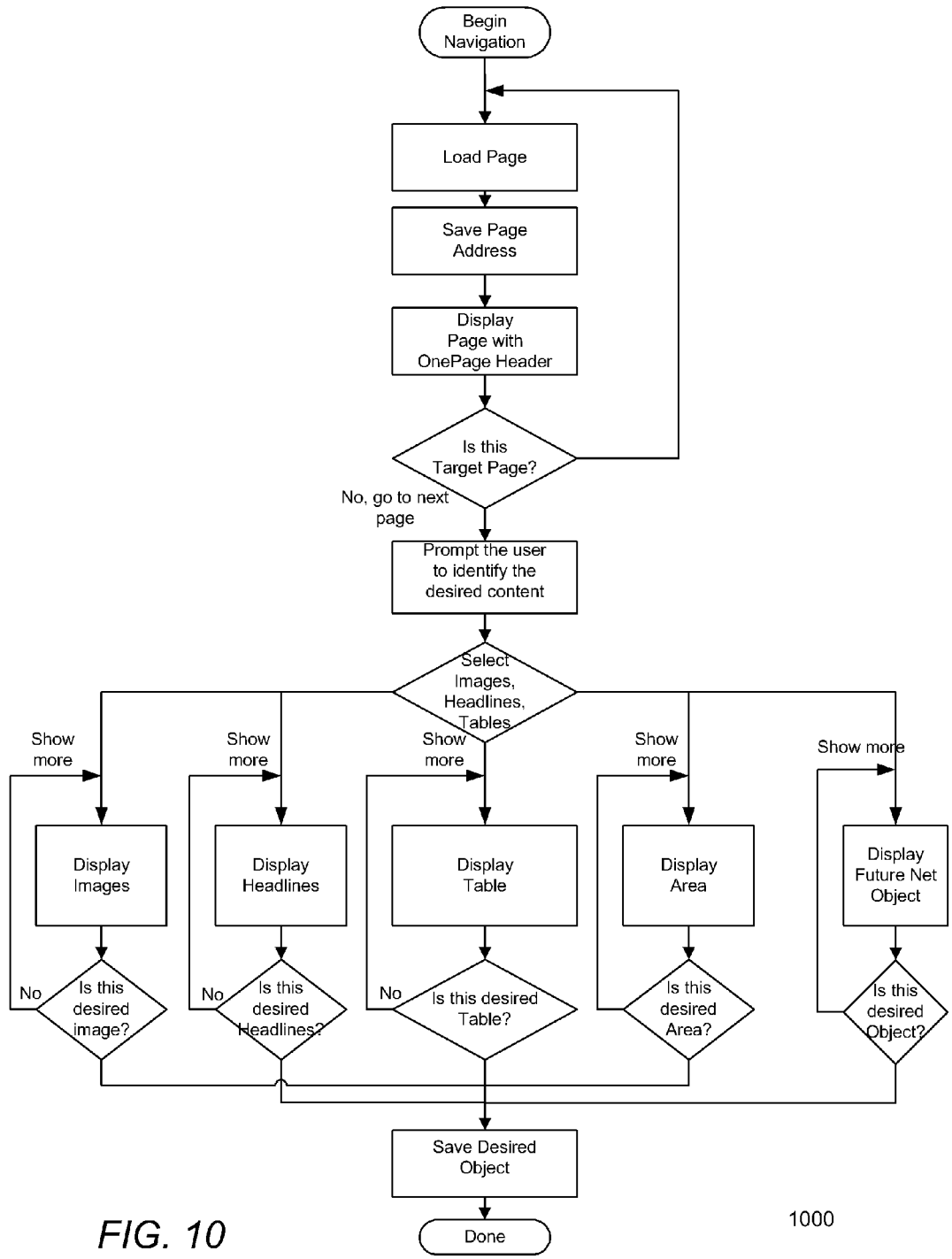
FIG. 10 is a flowchart for identifying desired objects distributed over a target page.

During navigation mode, illustrated in flowchart 1000 of FIG. 10, every hypertext link on the page is modified by the content server. When a hyperlink tag is clicked on, the page request is sent back to the navigation server providing a record of every user action. The user will continue in "navigation" mode until the page is reached containing the desired collection object. This process allows the user to "drill down" many pages deep into a Web site looking for the desired target information. This process also makes it possible to save all of the "Web parameters" necessary to reach the target information again without user intervention. For example, username, password, and other items such as search criteria are all monitored and saved during navigation to be used to recollect the information again mechanically and quickly by the collection server.

When the page containing the desired information target object is viewed, the user will click on the "stop" button. The "content" server will send a page to the user prompting a selection of the desired information he or she wishes to collect from the page. The user is engaged in a dialog to accurately identify the item or items on the page to collect. If needed, the software prompts the user for "parameter" information such as "search criteria" or "address information" needed to replay the information request later.

The content server will extract all objects of the desired page and present those objects on a "preview" page. In embodiments of the invention, each object is evaluated before it is displayed so that the "most valuable" information objects are displayed first. For example, the largest graphic object that is located in the center of the page will be displayed first on the preview page. The preview page will show the desired objects allowing the user to choose the object to send to his or her page.

By clicking on the "add to page" button the information target reference is sent back to the portal server 700 at FIG. 7 where it is saved as part of the user's page definition. The next time the page is updated, the portal server 700 will send the user's page to the browser and the browser will request the new information object as one of many objects collected in parallel in real-time by the content servers.

CAPTURE AND AGGREGATION OF DATA FROM DYNAMIC CONTENT

Overview of DataParts system and methodology

The DataParts system and methodology of the present invention allows users to capture dynamic content from a variety of sources such as Web pages, databases, and XML documents and replay or reuse the captured content. The present invention is particularly useful in providing an easy-to-use and flexible means to capture and aggregate data from sources with "repetitive records". Each captured element is a "single capture" and is used with other elements. The present invention may be used to extract "records" of data from a data source and then aggregate extracted records from several sources. The aggregate, extracted records may then be deployed to a Web site or a database. The present invention can, for example, be used to capture elements from one or more data sources and then combine elements to produce a "Web application" from the captured elements.

The present invention may be used to "repurpose" data, for instance by aggregating information (e.g., catalog information) from one source into an XML document. A wealth of information is available on HTML pages that are available via the Internet. The present invention enables this information to be harvested for use in a number of different applications. For example, information extracted from HTML pages and aggregated into an XML document can then be integrated into a database which is deployed for use on a mobile handheld device. Instead of using a HTML-to-XML transformer, the present invention enables better translation at the data level without requiring the use of programmers. The present invention may also be used for "re-syndication" by aggregating information from a data feed and resending the information in a different format and accompanied by additional data extracted from a completely different source. Another application of the present invention is "catalog-integration" in which information from a Web site is processed to obtain "record level" data that can be easily integrated into a catalog.

The present invention provides the ability to aggregate data from a number of different, and even dissimilar, sources. This ability to aggregate data from dissimilar sources can be used to facilitate rapid enterprise application integration (EAI). The system of the present invention can aggregate information from different sources and send messages based on the aggregated information. This "two-way" EAI makes it possible to translate data into Web applications without having to use programmers to program a custom solution.

Using the present invention it is possible to extract data from HTML pages and other sources, aggregate data, submit forms, and post messages to process queues easily. Data aggregation is often thought of in terms of database records and fields. Using the system and methodology of the present invention, published information such as articles, stories, and other text can be aggregated using built-in extensions to identify and tag "text-runs" such as article titles, bylines, dates, and body text.

The system of the present invention includes a visual content development user interface. This user interface makes it possible for a user to integrate legacy systems non-intrusively without requiring modifications to the legacy systems or knowledge of legacy system data structures and transactions. The system can also be used as a shared user interface to existing data transformers and adapters and turn "single threaded" adapters into "multi-pass" data aggregation tools.

Business integration packages, such as WebMethods, model data with uniform modeling language (UML) based modeling techniques built around "structured data" in database structures or XML documents. The DataParts system of the present invention can be used with business integration packages to extend process modeling to "semi-structured" and "unstructured" data. The DataParts system can also aggregate data in real time without the need to "aggregate and save" into a repository before using the data. Data extracted and aggregated using the present invention can be deployed to a number of portal/Web application servers. Alternatively, data aggregated with the DataParts system can be structured as an XML document or spreadsheet. Some examples illustrating the user interface of the DataParts system and operations that may be performed using the system will next be described

USER INTERFACE AND EXAMPLE OPERATIONS

FIGS. 11A-G are a series of screen shots illustrating several screens of the user interface of the currently preferred embodiment of the DataParts system. Operations that may be performed using the system's user interface will also be described in order to illustrate the use of the system for extracting and organizing data collected from one or more data sources. For example, a user (e.g., content manager) may wish to collect, extract, and organize information from a number of news articles available on a news organization's Web site. For each article, the content manager may want to extract certain information such as the title, author's name, date, and text body of news articles from Web pages (HTML pages) of the Web site. The content manager could write (or could hire a programmer to write) a program (e.g., in PERL or Java) to extract this information. However, if any changes were made to the Web pages containing the content, the content manager would generally be required to change the program in order to continue to collect and extract the desired information from these Web pages.

The system and methodology of the present invention allows a user (e.g., content manager) to create a model of the Web page(s) of interest. The DataParts system provides a convenient interface to assist the user in building a model for extracting and aggregating information of interest from the data sources (e.g., Web pages) selected by the user. In operation, the use of the system of the present invention in extracting and using desired information from one or more Web pages generally proceeds as illustrated by the following example.

Figure 11A:
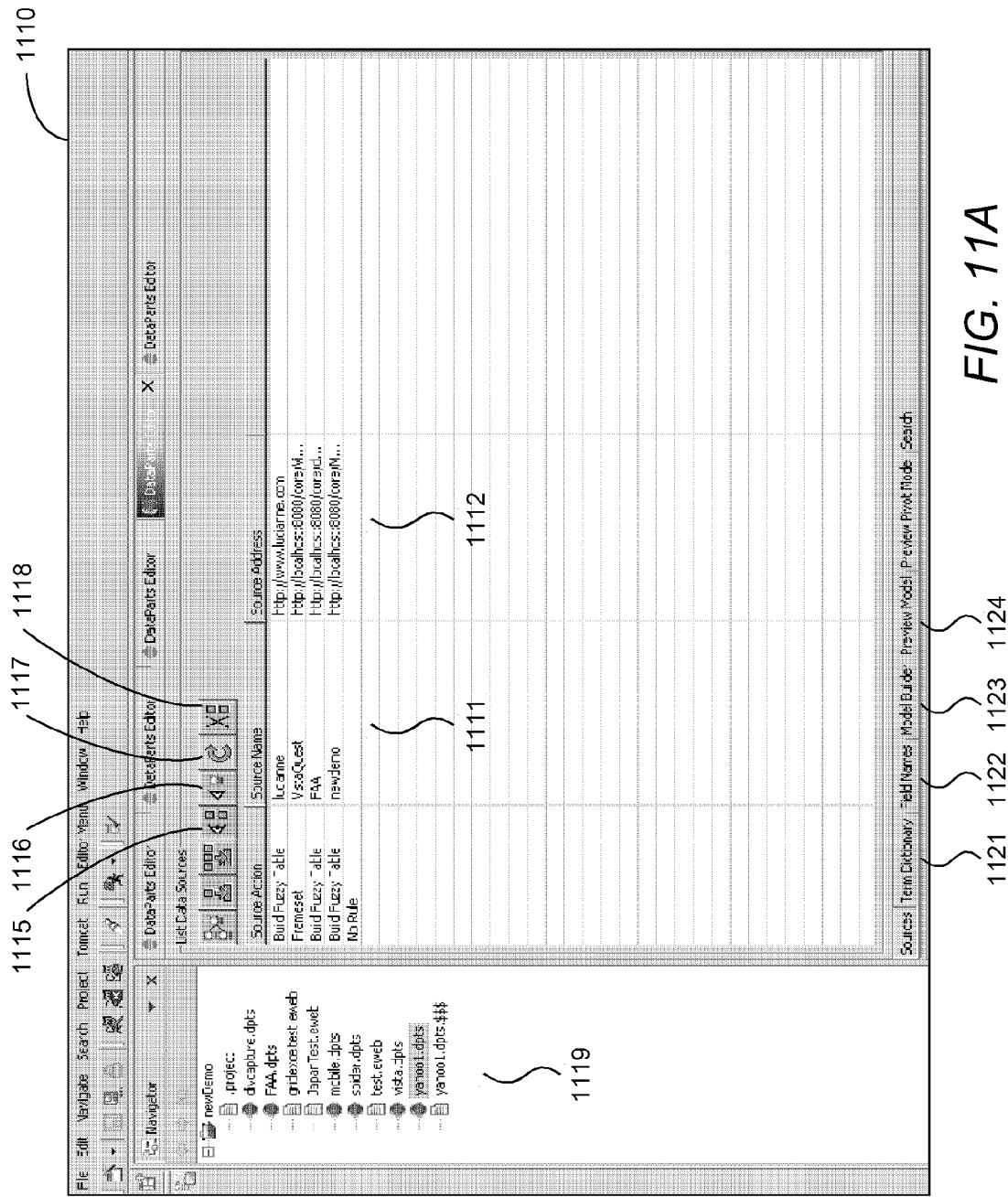

First, the user selects a list of sources of information (e.g., particular Web sites) from which the user wishes to capture information. FIG. 11A is a screen shot of a sources screen 1110. As shown, the sources screen 1110 may be used to list the selected information. The user can select sources of information and assign names to each of the selected sources. A source name column 1111 includes the name of the source, and a source address column 1112 includes the URL for the source. In the currently preferred embodiment, data sources can be identified using a Content Collection Language (CCL) statement or by a URL.

Buttons at the top of the source screen 1110 include a view source button 1115, a view output button 1116, a build model button 1117, and a remove source entry button 1118. The tree list view 1119 on the left of the source screen 1110 is a list of all existing projects. As shown at FIG. 11A, several Web sites are selected, including the sources named "Iucanne", "VstaQuest", "FAA", and "newdemo" in the source name column (field) 1111. Several tabs are also included at the bottom of the source screen 1110, including a term dictionary tab 1121, a field names tab 1122, a model builder tab 1123, and a preview model tab 1124.

As sources are identified, a user may select the term dictionary tab 1121 to open a term dictionary screen 1130 shown at FIG. 11B. The term dictionary screen 1130 allows the user to improve object identification by adding "problem specific terms" to the model. In this example, the entries in the term column 1132 and model tag column 1133 indicate that the user is looking for text that includes the terms "Original Article", or "Posted By". The dictionary action column 1131 enables the user to specify the action to be taken for each model term. The model terms can be used with "fuzzy" Feature Extraction tags or they can replace the fuzzy Feature Extraction tags completely.

Figure 11C:
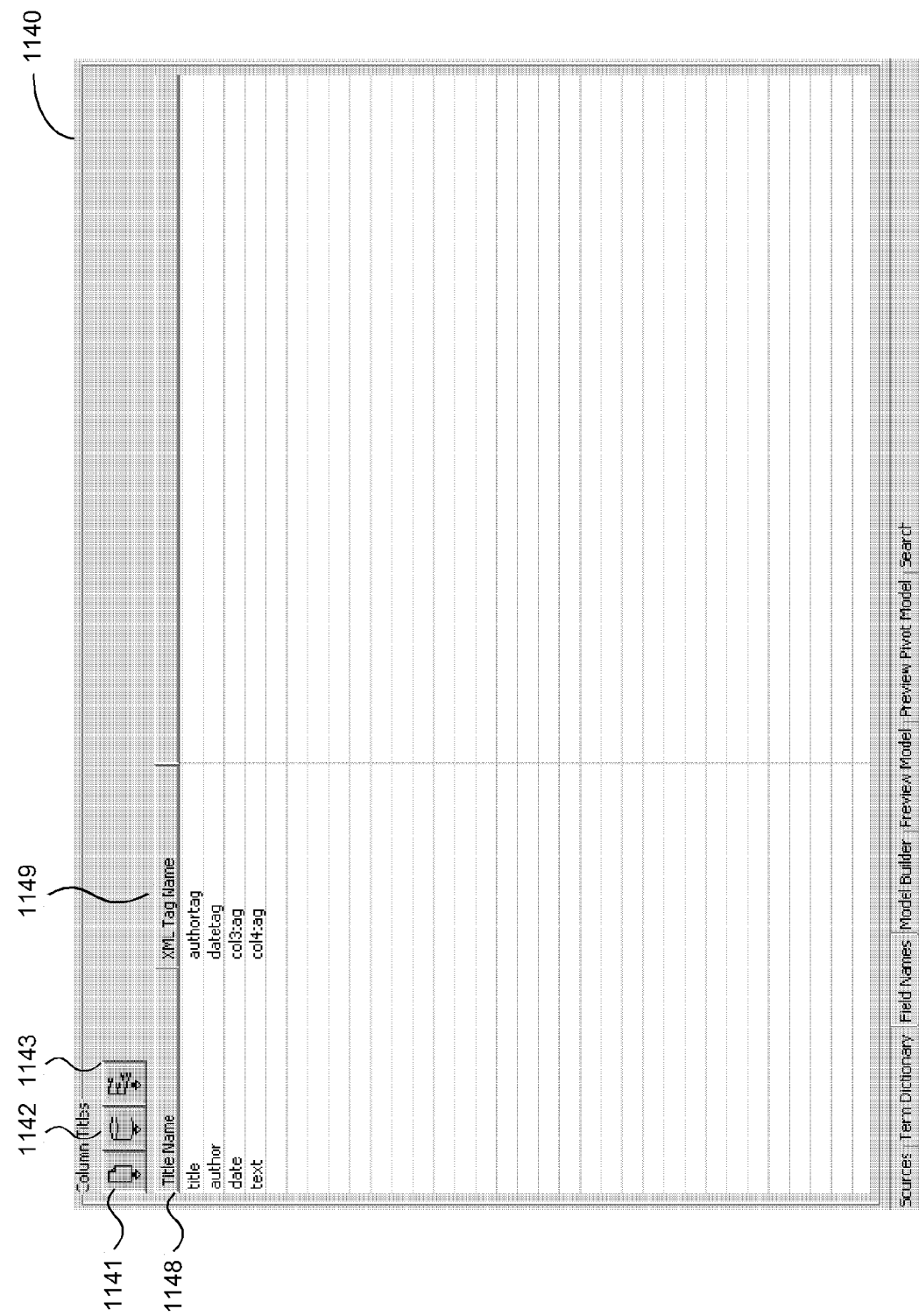

The user may also select the field names tab 1122 on the source screen 1110 to open a field names screen or window. The field names screen 1140 is illustrated at FIG. 11C and is used to define the "model output". In this example, the user indicates in the title name field 1148 that he or she wants the output organized into fields (columns) with the names "title", "author", "date", and "text". The XML tag name field 1149 indicates the XML tag to be assigned to each of the named fields (i.e., the names listed in the title name field 1148) when output is generated. Buttons at the top of the field names screen 1140 also allow the user to import field names. Buttons 1141, 1142, and 1143 allow the user to import field names from a file, database, and XML DTD, respectively.

At this point the user has identified several sources of information. The user has also indicated information that is of interest and which should be extracted from these sources, and has also indicated how the output should be organized (e.g., into four columns "title", "author", "date", and "text").

The model builder component of the system may now be used to parse the identified Web page(s) into "atoms" of information as previously described. The Feature Extraction technology is used to extract the desired items of information from the information sources. More particularly, the build model button 1117 at the top of the source screen 1110 shown at FIG. 11A may be selected to commence the model building process. The model builder screen 1150 shown at FIG. 11D illustrates results of the process of parsing a source page into its smallest "atoms" including "runs of text". The parsed items of information include every delimited run of text included on the page. These runs of text may include, for example, headlines, body text, and the like. As shown at FIG. 11D, each run of text is displayed with its destination output name in the column name field 1151, feature extraction tag in the content tag field 1152, and run of text in the content text field 1153.

Figure 11E:
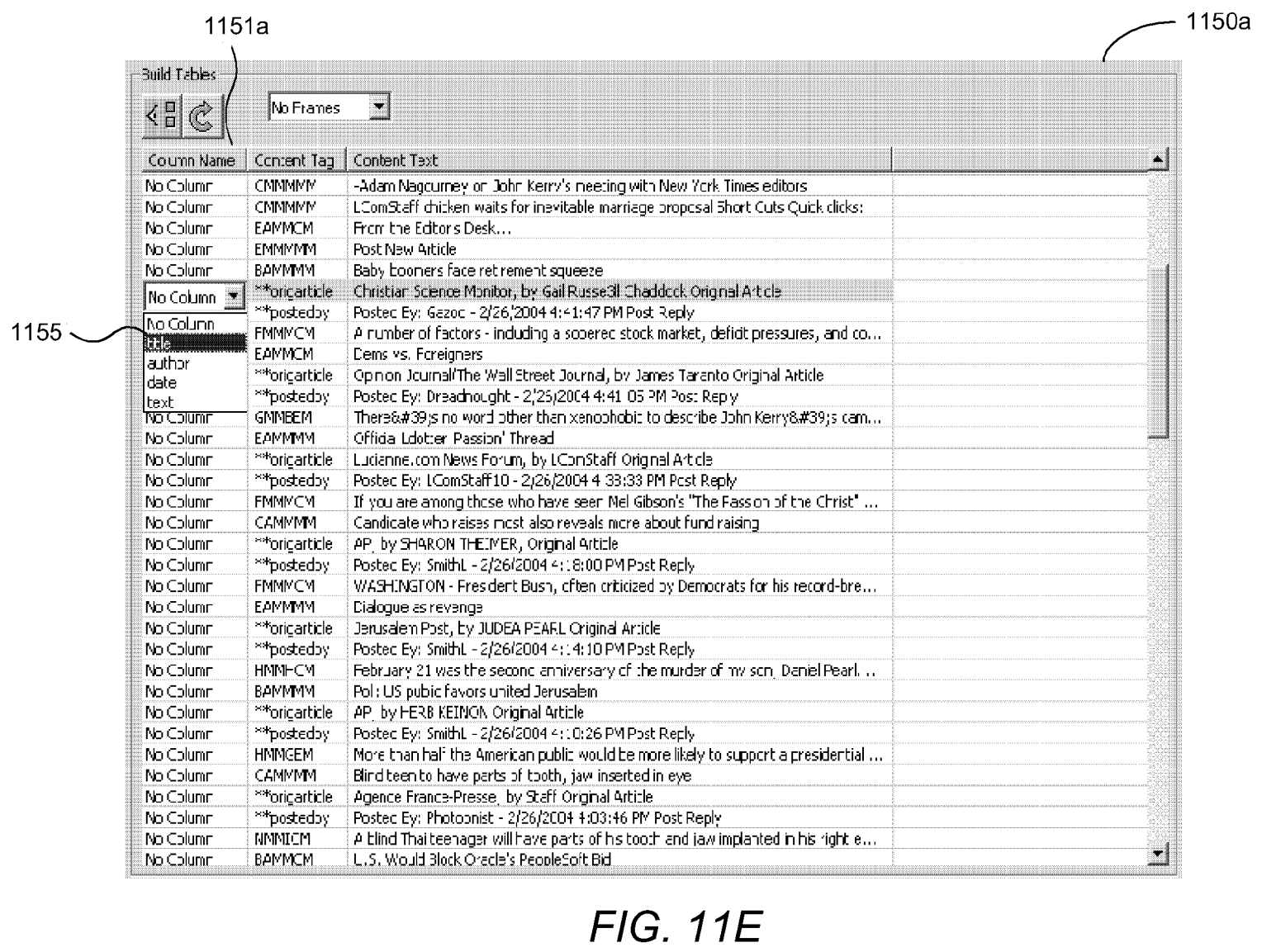

FIG. 11E is another view of the model builder screen 1150a. As shown at 1155, a user may select (e.g., with a "mouse down" action) a drop down menu on the column name field (now 1151a) to assign any run of text to any column name defined in the field names screen 1140 shown at FIG. 1C. In this example, any run of text can be sent to the "title", "author", "date", or "text" column for output as shown at 1155. Currently, when any feature tag is selected and assigned to an output column, all text runs with the same feature tag are also sent to the same output column. For example, if the user assigns a text run to the "author" output column, other text runs with the same feature tag are also sent to the author output column. This enables a user to easily map extracted information (e.g., strings of text) to desired columns.

Figure 11G:
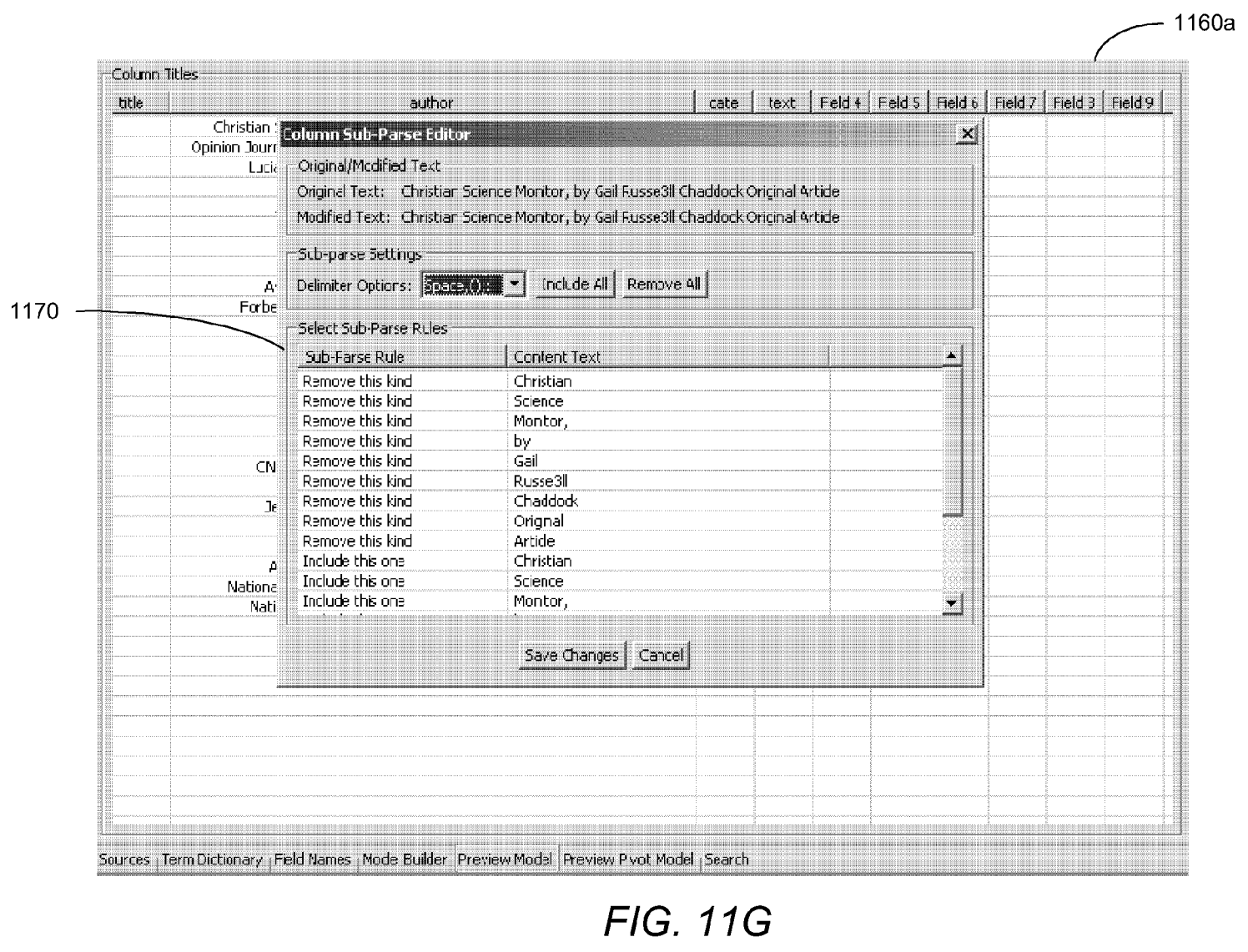

The preview model screen 1160 illustrated at FIG. 11F displays the runs of text (items of information) as they are assigned in the model builder screen 1150. In this example, all runs of text that include "author" (i.e., author's name) are shown in the author column 1161. FIG. 11G is another view of the preview model screen 1160a. By selecting (e.g., clicking on) the column title, a sub-parse editor dialog box 1170 is displayed. The sub-parse editor dialog box 1170 allows the user to remove any undesired text in a column (field) of output. In this example, all text can be removed except for the author's name. This enables the user to easily filter information that is not of interest. After the above operations have been completed, the user can display and/or save the information that has been extracted and aggregated. For example, the information can be saved into columns and rows of a database system or as an XML document. This facilitates reuse of the information.

In this fashion even a user that is not a programmer may use the system to access a source of data (e.g., a Web site), select information to be captured, and build an organized model for extracting and organizing the captured information. The model that is built can then be used (e.g., the following day) for capturing updated information from the same data sources, even though the particular information on the page may have changed. In this example of a news Web site, it is likely that the headlines, authors, and other such information on the Web site changes on a daily or more frequent basis. The model built using the system of the present invention still captures and extracts information from Web page(s) of the site and organizes the extracted information. The model can be considered as including meta data which facilitates collection of content from HTML pages and transformation of the content into structured output. The present invention enables unstructured or semi-structured data to be collected and organized so that it can be stored and/or reused for various purposes. In addition, the system enables a user without extensive technical expertise to quickly and easily build a model for extracting and aggregating information that would take hours, if not days, of effort by a programmer. The components of the currently preferred embodiment of the DataParts system will next be described.

SYSTEM COMPONENTS

Figure 12:
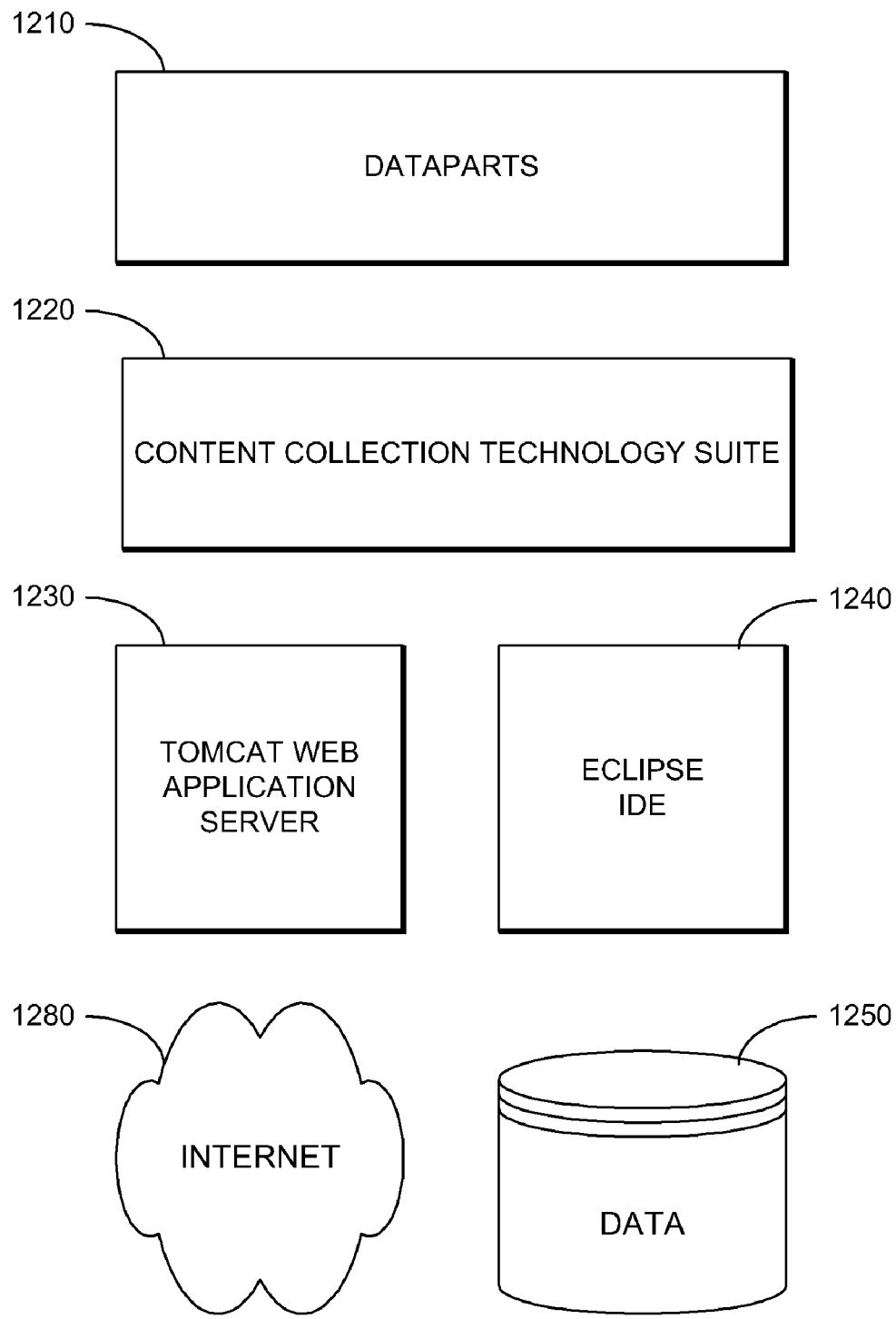
FIG. 12 is a high-level block diagram of an environment in which components of the present invention may be preferably embodied.

FIG. 12 is a high-level block diagram of an environment 1200 in which the present invention may be preferably embodied. As shown, environment 1200 includes a Data-Parts component 1210, a Content Collection Technology Suite 1220, a Tomcat Web Application Server 1230, and an Eclipse Integrated Development Environment (IDE)1240. Also shown at FIG. 12 is a database 1250 and the Internet 1280.

The DataParts component 1210 is a java-based Eclipse "plug-in" that provides the user interface component and Java code specific for content aggregation. The DataParts component takes advantage of the Eclipse Integrated Development Environment to deliver a powerful and easy to use content management and aggregation application. The Data-Parts component 1210 also uses the same Content Collection library as the "ultra-personalization" software described earlier in this document.

The Content Collection Technology Suite 1220 is a library of Java-based software that includes the Navigation, Feature Extraction, and Content Collection Language features described above in this document. The specific processes used and features supported in the Content Collection Technology Suite include those described above in this document and illustrated in FIGS. 3, 4, 5, 6, and 10.

The Tomcat Web Application Server 1230 is a Java-based Web application container that was created to run Servlet and JavaServer Page ("JSP") Web applications. Tomcat is available from the Apache Software Foundation and has become the reference implementation for both the Servlet and JSP specifications. Tomcat was originally developed as the reference implementation of the Servlet specification and is designed to be a fast and efficient implementation of the specification. For further description of Tomcat, see e.g., "The Tomcat 5 Servlet/JSP Container" documentation available from the Apache Software Foundation, the disclosure of which is hereby incorporated by reference. A copy of this document is available via the Internet (e.g., currently at jakarta.apache.org/tomcat/index.html).

The Eclipse IDE 1240 is an open extensible IDE providing building blocks and a foundation for constructing and running integrated software-development tools. Eclipse is available from the Eclipse Foundation and supports a multi-language, multi-platform, multi-vendor environment. Eclipse is written in the Java language and provides a plug-in based framework for creating, integrating, and utilizing software tools. For further description of Eclipse, see e.g., "Eclipse 2.1.3 Documentation" available from the Eclipse Foundation, the disclosure of which is hereby incorporated by reference. A copy of this document is available via the Internet (e.g., currently at www.eclipse.org).

Figure 13:
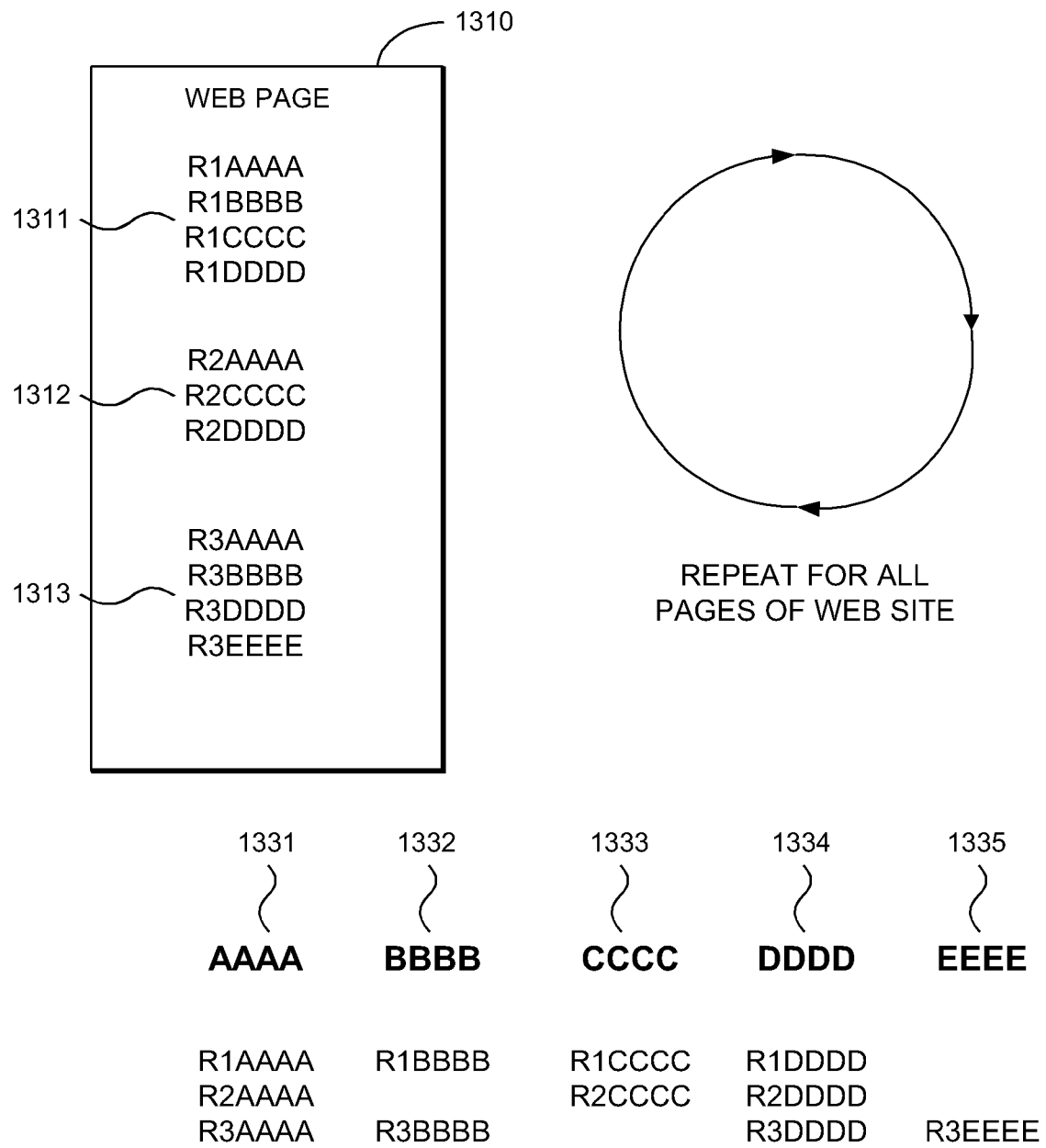
FIG. 13 is a block diagram illustrating the process of capturing and extracting information of interest from a Web page.

FIG. 13 is a block diagram illustrating the process of capturing and extracting information of interest from a Web page. As shown, the Web Page block 1310 has three repeating records such as R1XXXX (record 1311), R2XXXX (record 1312) and R3XXXX (record 1313). The DataParts system divides the items of content on the Web page 1310 and groups the items (e.g., the repeating records) according to their "content features". As shown at FIG. 13, the records are grouped into five columns AAAA (1331), BBBB (1332), CCCC (1333), DDDD (1334), and EEEE (1335). The DataParts system identifies fields in a record and ensures that fields from record 1311 are not grouped with fields from record 1312. As shown at FIG. 13, record 1312 does not have a field BBBB or a field EEEE, so no entries for this record are shown in columns 1332 and 1335. Similarly, record 1313 does not have a field CCCC as shown at column 1333. After records and fields are created for a single page, the entire site can be "spidered" to retrieve similar records and fields from every page of the site. The DataParts system then outputs the results to a spreadsheet or XML document and/or saves the results to a database.

DETAILED OPERATION

Figure 14:
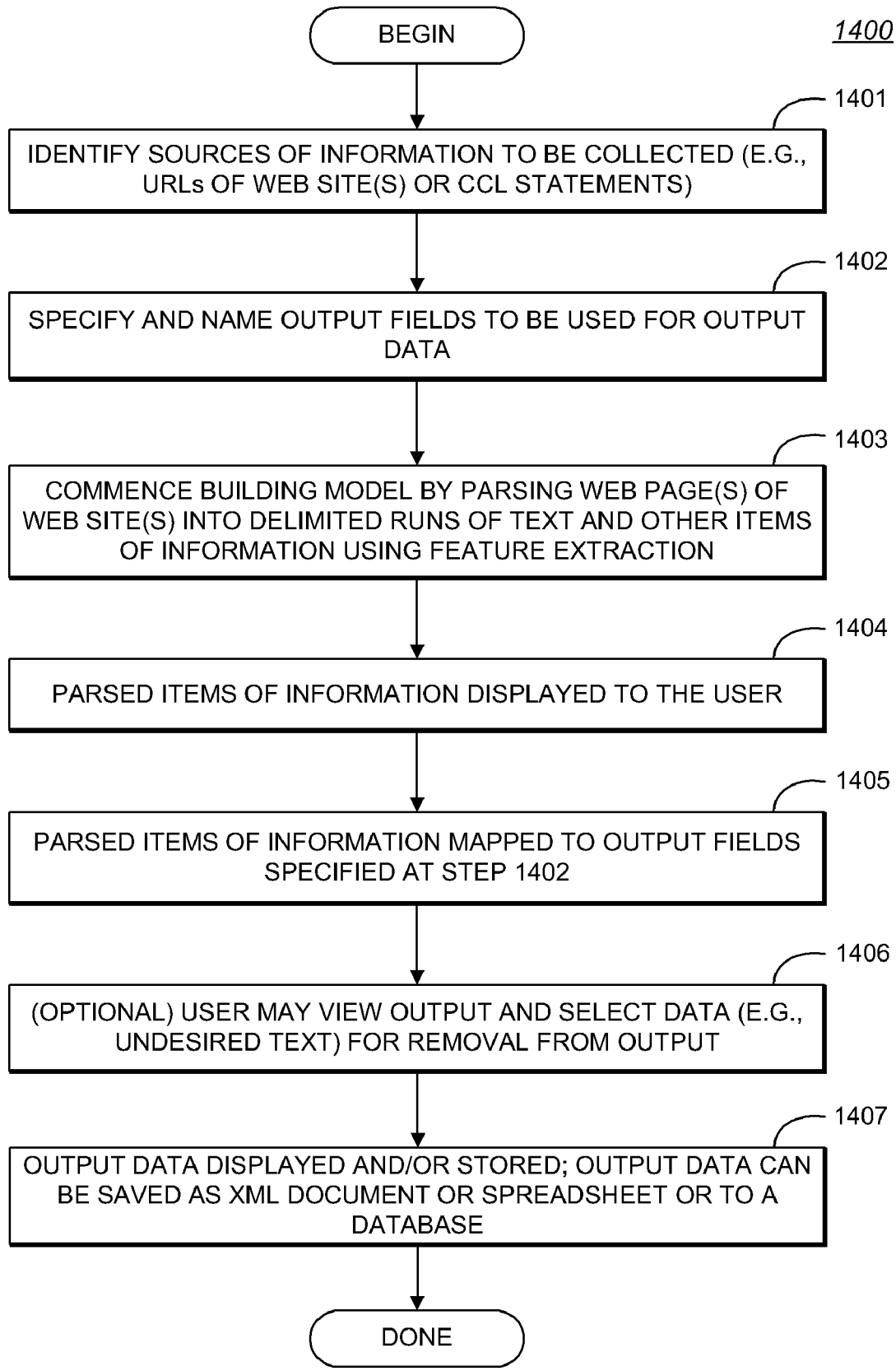
FIG. 14 is a flowchart illustrating the operations of the system in extracting and aggregating data from dynamic content.

FIG. 14 is a flowchart 1400 illustrating the operations of the system in extracting and aggregating data from dynamic content. The following description presents method steps that may be implemented using processor-executable instructions, for directing operation of a device under processor control. The processor-executable instructions may be stored on a computer-readable medium, such as CD, DVD, flash memory, or the like. The processor-executable instructions may also be stored as a set of downloadable processor-executable instructions, for example, for downloading and installation from an Internet location (e.g., Web server).

The following discussion uses an example of a user that is using the present invention to aggregate stock information, interest rates, and commodity prices for display on a display screen of a computing device. Typically, all of this information is not already available and collected on a single Web page (HTML page). However, using the system and methodology of the present invention, this type of information can be collected from multiple sources and aggregated for display to the user as described below.

At step 1401, the process begins with identifying the source(s) of the information of interest that is to be collected. The user (e.g., content manager) may use the above-described sources screen of the DataParts system to enter information identifying each source of information from which data is to be collected (e.g., URLs of Web site(s) or CCL statements). For example, the user may select a financial Web site such as www.cnnfn.com as a source of stock information. A second Web site may be selected for interest rate information, and a third Web site selected for commodity prices. Typically, the URL of the specific Web sites from which information is to be collected are identified and entered into the system. After the sources of information have been identified, the user (content manager) specifies the (output) field names to be used for output data at step 1402. For example, the user may specify a "name" field (e.g., for name of stock or commodity), a "price" field, and a "change" field (e.g., percentage change in price).

Next, the user may commence building the model based on the above sources of information. At step 1403 the system parses Web page(s) of the identified Web site(s) into delimited "runs of text" and other component items (or "atoms") of information using the Feature Extraction technology to extract the desired items of information from the selected information sources. At step 1404, the parsed items of information are displayed to the user. This parsed information includes delimited "runs of text" included on the Web pages of the selected Web sites.

At step 1405, the user maps items of information to the output fields he or she has specified (i.e., at step 1402). In this example, the content manager may select particular runs of text (or other items of information) and assign them to the "name", "price", or "change" fields. A visual user interface is provided in the currently preferred embodiment of the system to enable a user to visually map items of information to particular fields. In addition, when an item having a particular feature tag is selected and assigned to a particular output field, other items with the same feature tag are automatically sent to the same out-put column (field). After the user has mapped the items that are of interest to the appropriate output fields, at (optional) step 1406, the user may view the results and select data (e.g., undesired text or the like) for deletion from each of the output fields. As previously illustrated (e.g., at FIGS. 11F-G), a preview screen and sub-parse editor are provided in the currently preferred embodiment to enable the user to view the aggregated data and filter out information that is not desired. When the above steps have been completed, the output data may then be displayed and/or stored at step 1407. The output data can be saved as an XML document or spreadsheet. The output data from the model can also be output in HTML, XHTML, or cHTML format, as desired. Alternatively, (or in addition) the output data can be saved to columns and rows (i.e., tables) of a database.

Searching Web Page for Desired Content

The following sample code shows in further detail how the system of the present invention can search a particular Web page for content of interest:

```
 1:    URL thisURL = new URL(theURL);
 2:
 3:    CachedURL thisCachedURL = new CachedURL(thisURL);
 4:
 5:    FECell1 fec1 = new FECell1(thisCachedURL);
 6:        String tag;
 7:        FEState1 theState = null;
 8:    // divide each page into an array of objects called 'states'
 9:        fec1.getFEStates( );
10:
11:    long highScore = 0;
12:    String highTag = "";
13:
14:    // for each object on the page example the TableTag to see
15:    //if it fits our desired target description score.
16:    if (fec1._tableTags.size( ) > 1)
17:        {
18:        for (int i = 1;i < fec1._tableTags.size( ); i++)
19:            {
20:                theBody = "";
21:                theState = (FEState1)fec1._tableTags.elementAt(i);
22:                tag = theState.getTableTag( );
23:
24:
25:            long score = 0;
26:            score += tag.charAt(7) * 800;
27:            score += tag.charAt(8) * 1000;
28:            if (score > highScore)
29:                {
30:                highScore = score;
31:                highTag = tag;
32:                }
33:            }
34:        theCCL = FEStatic.buildQuickCCLcommand(theURL,
"",highTag);
35:        }
```

The "FECell1" object illustrated at lines 5-9 above divides the identified Web page into an array of "FEStates". Each of these FEStates (objects) has all of the attributes of an area on the Web page. The loop commencing at line 18 searches through the array of states (FEStates) looking for the desired targeted content. Attributes that can be tested may include such characteristics as the number of "anchor links", the number of "images", the number of "nested tables", and the type and attributes of text styles such as fonts. The list of collected attributes and characteristics for some content searches can be very extensive. In some cases the list of collected attributes and characteristics for a content search can reach well over 100 items.

The system extends basic HTML feature recognition to include text style information. In its presently preferred embodiment, the DataParts system can recognize over 60 text style combinations and use these features to distinguish fields and records within a Web page. The system uses HTML tags as part of its feature extraction but has additional support for "runs of text". In order to correctly define records and fields, the content is removed from its HTML format (which is a page definition language and used to define how the page appears) and transformed into a pure text representation that maintains text style information. The system also includes Feature Extraction routines to identify patterns in dates and numbers. These date and numeric features enable the system to identify differences between fields and records.

Building Model of Web Pages

When a Web page has been divided into objects and "feature tags" a model is built placing each object found on a source page into the correct column of output data as illustrated by the following routine:

```
1:  // for each 'column name' step through the table objects looking for a matching object
2:  for (int i = 0; i < theEditor._columnNameTable.getItemCount( )-1; i++)
3:  {
4:     ti = theEditor._columnNameTable.getItem(i);
5:     TableColumn col = theEditor._previewTable.getColumn(i);
6:     col.setText(ti.getText(0));
7:  }
8:
9:     theEditor._previewTable.removeAll( );
10:    TableItem sourceRow;
11:    TableItem previewItem = previewItem = new TableItem(theEditor._previewTable, SWT.NULL);
12:
13:
14:    // step through each object on a page looking for a match
15:    for (int r = 0;r < theEditor._modelTable.getItemCount( ); r++)
16:    {
17:       sourceRow = theEditor._modelTable.getItem(r);
18:
19:
20:       for (int fieldIndex = 0; fieldIndex < theEditor._columnNameTable.getItemCount( )-1;fieldIndex++)
21:       {
22:          ti = theEditor._columnNameTable.getItem(fieldIndex);
23:             String fieldName = ti.getText(0);
24:
25:
26:       //if there is a match place this object into the correct column of the output table
27:
28:             if (sourceRow.getText(0).indexOf(field Name) != -1)
29:                {
30:       // preview row full add new row
31:             if (previewItem.getText(fieldIndex).length( ) > 0) previewItem = new TableItem(theEditor._previewTable, SWT.NULL);
32:          String theContent = sourceRow.getText(2);
33:          previewItem.setText(fieldIndex,applyTextRules(fieldIndex, theContent));
34:                }
35:          }
36: }
```

For each "column name" the above routine steps through the table objects looking for matching objects. Matching objects that are found are placed into the correct column of the output table. The data that is output can then be saved into a XML file, database file, or a spreadsheet document, as desired.

While the invention is described in some detail with specific reference to a single-preferred embodiment and certain alternatives, there is no intent to limit the invention to that particular embodiment or those specific alternatives. For instance, those skilled in the art will appreciate that modifications may be made to the preferred embodiment without departing from the teachings of the present invention.

What is claimed is:

1. A method for extracting and structuring items of data from content available via the Internet, the method comprising:
receiving input of a user specifying at least one source of content available via the Internet, types of data to be extracted from said at least one source, and fields for structuring extracted items of data;
retrieving content from said at least one source;
parsing the retrieved content to extract items of data of the types specified by the user;
mapping the extracted items of data to the fields specified by the user so as to transform the extracted items of data into a structured format;
generating a feature tag for each extracted item of data, the feature tag identifying attributes of the item of data and the structured format of the item; and
in response to a subsequent request for an item of data, using the feature tag to obtain the item of data and transform it into the structured format.

2. The method of claim 1, wherein said at least one source of content includes a Web site.

3. The method of claim 1, wherein said at least one source of content includes an HTML page.

4. The method of claim 1, wherein said receiving step includes receiving a URL specifying a source of content available via the Internet.

5. The method of claim 1, wherein said receiving step includes receiving user input specifying attributes of data to be extracted from said at least one source.

6. The method of claim 1, wherein said retrieving step includes retrieving a Web page.

7. The method of claim 6, wherein said Web page comprises a selected one of an HTML page, an cHTML page, and an XHTML page.

8. The method of claim 6, wherein said parsing step includes parsing container objects of the Web page.

9. The method of claim 8, wherein said parsing step includes creating a new object for a particular container object of the Web page, the new object containing information for the particular container object.

10. The method of claim 8, wherein said generating step includes creating feature tags for elements of the container objects.

11. The method of claim 10, wherein said creating feature tags step includes creating information for selected one of a headline, a graphic object, a button, and a run of text.

12. The method of claim 1, wherein said generating step includes creating feature tags based on attributes of each extracted item of data.

13. The method of claim 1, wherein said step of using the feature tag to obtain the item of data and transform it into the structured format includes substeps of:
saving at least some of the feature tags; and
subsequently, using a saved feature tag to retrieve an item of data from a Web page and transform it into the structured format.

14. The method of claim 1, wherein said mapping step includes receiving user input for selecting a particular field for placing a given item of data.

15. The method of claim 14, wherein said mapping step farther comprises automatically mapping other items of data similar to the given item of data to the particular field.

16. The method of claim 1, wherein said mapping step includes generating an XML document including the extracted items of data.

17. The method of claim 1, wherein said mapping step includes saving the extracted information to a database table.

18. A computer-readable medium having processor-executable instructions for performing the method of claim 1.

19. A downloadable set of processor-executable instructions for performing the method of claim 1.

20. A method facilitating retrieval of an item of dynamic content available via the Internet, the method comprising:
receiving input of a user specifying an item of dynamic content available from a source of dynamic content available via the Internet and a format for the item of dynamic content;
generating a feature tag for an item of dynamic content, the feature tag including a plurality of characters with each character in the plurality of characters indicating an attribute of the item;
in response to a subsequent request for retrieval of the item, parsing the feature tag to identify a plurality of attributes of the item;
retrieving the item of dynamic content from the source of dynamic content based upon the plurality of attributes of the item; and
transforming the item of dynamic content into the format specified by the user.

21. The method of claim 20, wherein said source of dynamic content includes a Web site.

22. The method of claim 21, wherein said Web site includes a Web page at least partially encoded in at least one markup language.

23. The method of claim 22, wherein said at least one markup language includes a selected one of HTML and XML.

24. The method of claim 20, wherein said receiving step includes receiving a URL specifying a source of dynamic content available via the Internet.

25. The method of claim 20, wherein said receiving step includes receiving user input specifying attributes of data to be retrieved from said source of dynamic content.

26. The method of claim 20, wherein said generating step includes retrieving a Web page containing at least one item of dynamic content.

27. The method of claim 26, wherein said Web page comprises a selected one of an HTML page, an cHTML page, and an XHTML page.

28. The method of claim 26, wherein said generating step further comprises:
parsing the Web page to generate the feature tag.

29. The method of claim 28, wherein said parsing substep includes parsing container objects of the Web page.

30. The method of claim 20, wherein said generating step includes generating a first character of the feature tag for identifying the item of dynamic content as a selected one of a graphic object, a table object, a text object, a headline object, and a form object.

31. The method of claim 30, wherein the feature tag further comprises a plurality of characters identifying a plurality of attributes of the item of dynamic content.

32. The method of claim 31, wherein the plurality of characters are ordered in order of significance of corresponding attributes represented by the characters.

33. The method of claim 20, further comprising:
saving the feature tag for subsequently retrieving the item from the source of dynamic content.

34. The method of claim 20, wherein said retrieving step includes loading a Web page identified based on the feature tag.

35. The method of claim 34, wherein said retrieving step includes extracting the item of dynamic content defined by the feature tag from the Web page.

36. The method of claim 34, wherein said retrieving step includes substeps of:
parsing container objects on the Web page;
examining each parsed container object to find a particular item having attributes matching the attributes generated based on the feature tag; and
if a particular item is found to match the attributes generated based on the feature tag, retrieving the particular item.

37. The method of claim 36, farther comprising:
if all container objects on the Web page are examined without finding a particular item having attributes matching the attributes generated based on the feature tag, retrieving an item most nearly matching the attributes generated based on the feature tag.

38. The method of claim 20, wherein said receiving input step includes mapping the item of content to a particular field specified by the user so as to transform the item of content into a structured format.

39. The method of claim 38, wherein said mapping step further comprises automatically mapping other items of content similar to the item of content to the particular field.

40. The method of claim 38, wherein said mapping step includes generating an XML document including the item of content.

41. The method of claim 38, wherein said mapping step includes saving the item of content to a database table.

42. A computer-readable medium having processor-executable instructions for performing the method of claim 20.

43. A downloadable set of processor-executable instructions for performing the method of claim 20.

44. A system for retrieving a plurality of web objects from a plurality of source pages for presentation to a web client, the system comprising:
a plurality of web objects at least partially encoded in one or more markup languages available from a plurality of source pages available on a network;
a web client having access to the plurality of source pages via the network;
a module for receiving input of user specifying web objects to be included in a web page presented to the web client and a format for the web objects;

a module for generating feature tags for the specified web objects, each feature tags for identifying a particular web object; and at least one content server having access to the network for retrieving web objects available on the plurality of source pages based on the feature tags and presenting the retrieved web objects to the web client in a web page in the format specified by the user.

45. The system of claim 44, wherein the one or more markup languages include a selected one of HTML and XML.

46. The system of claim 44, wherein the plurality of web objects include at least one of headline objects, table objects, form objects, and graphic objects.

47. The system of claim 44, wherein the module for generating generates a feature tag for a distinct area on a source page.

48. The system of claim 47, wherein the distinct area comprises a selected one of a single container and several nested containers on a source page.

49. The system of claim 44, wherein the web client comprises a web browser on a device connected to the Internet.

50. The system of claim 44, wherein the content servers are in communication with the web client via a local area network.

51. The system of claim 44, wherein the plurality of source pages are on a plurality of web servers available via the Internet.

52. The system of claim 44, wherein said each feature tag is used to locate a target web object even though static URLs on the source page containing the target web object have changed.

53. The system of claim 44, wherein said each feature tag includes a first character for identifying the web object as a selected one of a graphic object, a table object, a text object, a headline object, and a form object.

54. The system of claim 53, wherein the feature tag further comprises a plurality of characters identifying a plurality of attributes of the web object.

55. The system of claim 54, wherein the plurality of characters are ordered in order of significance of corresponding attributes represented by the characters.

56. The system of claim 44, wherein the module for receiving includes a Web browser interface allowing a user to navigate to a source page available on the Internet and mark web objects to be captured.

57. The system of claim 56, wherein the module for receiving records and processes actions by the user in navigating to a Web page and marking a web object.

58. The system of claim 44, wherein the module for retrieving provides for returning a container of a web object in response to a user request, so as to enable a user to select an area of a Web page including a given web object.

59. The system of claim 44, wherein the module for receiving user input includes a mapping module for mapping retrieved web objects to fields specified by the user so as to transform the web objects into a structured format.

60. The system of claim 59, wherein said mapping module includes a user interface for a user to map a particular web object to a particular field.

61. The system of claim 60, wherein said mapping module automatically maps other web objects similar to the particular web object to the particular field.

62. The system of claim 59, wherein said mapping module generates an XML document including the retrieved web objects.

63. The system of claim 59, wherein said mapping module saves the retrieved web objects to a database table.

* * * * *